United States Patent
Kato et al.

(10) Patent No.: US 10,723,203 B2
(45) Date of Patent: Jul. 28, 2020

(54) REFRIGERATION CYCLE DEVICE

(71) Applicant: DENSO CORPORATION, Kariya, Aichi-pref. (JP)

(72) Inventors: Yoshiki Kato, Kariya (JP); Nobuyuki Hashimura, Kariya (JP); Koji Miura, Kariya (JP); Norihiko Enomoto, Kariya (JP); Kengo Sugimura, Kariya (JP); Keigo Sato, Kariya (JP); Masayuki Takeuchi, Kariya (JP); Ariel Marasigan, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 117 days.

(21) Appl. No.: 16/060,036

(22) PCT Filed: Oct. 6, 2016

(86) PCT No.: PCT/JP2016/079722
§ 371 (c)(1),
(2) Date: Jun. 7, 2018

(87) PCT Pub. No.: WO2017/098795
PCT Pub. Date: Jun. 15, 2017

(65) Prior Publication Data
US 2018/0361828 A1    Dec. 20, 2018

(30) Foreign Application Priority Data

Dec. 10, 2015  (JP) ................................. 2015-240923
Aug. 10, 2016  (JP) ................................. 2016-157692

(51) Int. Cl.
*B60H 1/32*      (2006.01)
*F25B 5/04*      (2006.01)
(Continued)

(52) U.S. Cl.
CPC ......... *B60H 1/321* (2013.01); *B60H 1/00899* (2013.01); *B60H 1/32284* (2019.05);
(Continued)

(58) Field of Classification Search
CPC ............ B60H 1/00899; B60H 1/00928; B60H 1/321; B60H 1/32284; B60H 2001/3255;
(Continued)

(56) References Cited

U.S. PATENT DOCUMENTS

2005/0034473 A1  2/2005 Casar et al.
2006/0123824 A1  6/2006 Casar et al.
(Continued)

FOREIGN PATENT DOCUMENTS

DE         10213339 A1   10/2003
JP        2001074383 A    3/2001
(Continued)

*Primary Examiner* — Marc E Norman
(74) *Attorney, Agent, or Firm* — Harness, Dickey & Pierce, P.L.C.

(57) ABSTRACT

A refrigeration cycle device includes: a first expansion valve that decompresses a refrigerant flowing out of a high-pressure side heat exchanger; an exterior heat exchanger that exchanges heat between the refrigerant flowing out of the first expansion valve and outside air; a second expansion valve that decompresses the refrigerant flowing out of the exterior heat exchanger; a low-pressure side heat exchanger arranged in series with the exterior heat exchanger; a cooler core that exchanges heat between the heat medium cooled by the low-pressure side heat exchanger and air to be blown into a vehicle interior to cool the air; and a controller configured to switch between a heat absorption mode and a heat dissipation mode by adjusting an amount of decompression in each of the first expansion valve and the second expansion valve.

17 Claims, 14 Drawing Sheets

(51) Int. Cl.
  *F25B 49/02* (2006.01)
  *F25B 25/00* (2006.01)
  *F25B 6/04* (2006.01)
  B60H 1/00 (2006.01)
  *F25B 9/00* (2006.01)
  *F25B 40/02* (2006.01)

(52) U.S. Cl.
  CPC ............... *F25B 5/04* (2013.01); *F25B 6/04* (2013.01); *F25B 25/005* (2013.01); *F25B 49/02* (2013.01); *B60H 2001/00928* (2013.01); *B60H 2001/3255* (2013.01); *B60H 2001/3285* (2013.01); *B60H 2001/3298* (2013.01); *F25B 9/008* (2013.01); *F25B 40/02* (2013.01); *F25B 2309/061* (2013.01); *F25B 2339/047* (2013.01); *F25B 2341/0662* (2013.01); *F25B 2400/0417* (2013.01); *F25B 2600/2501* (2013.01); *F25B 2600/2513* (2013.01)

(58) Field of Classification Search
  CPC ...... B60H 2001/3285; F25B 5/04; F25B 6/04; F25B 25/005; F25B 40/02; F25B 49/02; F25B 2339/047; F25B 2341/0662; F25B 2400/0417; F25B 2600/2501; F25B 2600/2513
  See application file for complete search history.

(56) References Cited

U.S. PATENT DOCUMENTS

| | | |
|---|---|---|
| 2009/0260386 A1 | 10/2009 | Wittmann et al. |
| 2012/0222846 A1 | 9/2012 | Kadle et al. |
| 2012/0227431 A1* | 9/2012 | Wang ............... B60H 1/00921 62/238.7 |
| 2012/0255319 A1 | 10/2012 | Itoh et al. |
| 2013/0047643 A1 | 2/2013 | Higgins |
| 2015/0151609 A1 | 6/2015 | Satou et al. |
| 2015/0159933 A1 | 6/2015 | Itoh et al. |
| 2016/0109163 A1 | 4/2016 | Enomoto et al. |
| 2016/0288618 A1 | 10/2016 | Katoh et al. |
| 2017/0297415 A1 | 10/2017 | Satou et al. |
| 2017/0300013 A1 | 10/2017 | Satou et al. |

FOREIGN PATENT DOCUMENTS

| | | |
|---|---|---|
| JP | 2005512869 A | 5/2005 |
| JP | 2009257748 A | 11/2009 |
| JP | 2012117777 A | 6/2012 |
| JP | 2012225637 A | 11/2012 |
| JP | 2013256230 A | 12/2013 |
| JP | 2014020280 A | 2/2014 |
| JP | 2014156143 A | 8/2014 |
| JP | 2015013639 A | 1/2015 |
| WO | WO-2013145702 A1 | 10/2013 |
| WO | WO-2014119272 A1 | 8/2014 |
| WO | WO-2015004858 A1 | 1/2015 |

* cited by examiner

FIRST DEHUMIDIFICATION-HEATING MODE

SECOND DEHUMIDIFICATION-HEATING MODE

REFRIGERATION CYCLE DEVICE

CROSS REFERENCE TO RELATED APPLICATIONS

This application is a U.S. National Phase Application under 35 U.S.C. 371 of International Application No. PCT/JP2016/079722 filed on Oct. 6, 2016 and published in Japanese as WO 2017/098795 A1 on Jun. 15, 2017. This application is based on and claims the benefit of priority from Japanese Patent Applications No. 2015-240923 filed on Dec. 10, 2015, and No. 2016-157692 filed on Aug. 10, 2016. The entire disclosures of all of the above applications are incorporated herein by reference.

FIELD OF THE INVENTION

The present disclosure relates to a refrigeration cycle device that includes a heat exchanger for exchanging heat between a refrigerant and outside air.

BACKGROUND ART

Conventionally, for example, Patent Document 1 describes a vehicle refrigeration cycle device that includes a compressor, an interior condenser, a first expansion valve, a second expansion valve, an exterior heat exchanger, an interior evaporator, and an accumulator.

The compressor draws, compresses, and discharges a refrigerant. Refrigerant oil for lubricating the compressor is mixed into the refrigerant, and part of the refrigerant oil circulates within the cycle together with the refrigerant.

The interior condenser is a heat radiator that dissipates heat from a high-pressure refrigerant discharged from the compressor, thereby heating air that has passed through the interior evaporator to be blown into the vehicle interior.

The first expansion valve exhibits a decompression function of the refrigerant in an air-heating mode, a dehumidification-heating mode, and the like. The second expansion valve exhibits a decompression function of the refrigerant in an air-cooling mode, a dehumidification-heating mode, and the like.

The exterior heat exchanger exchanges heat between the refrigerant and the outside air. In the air-heating mode or the like, the exterior heat exchanger functions as an evaporator that demonstrates a heat absorption function by evaporating the refrigerant. In the air-cooling mode or the like, the exterior heat exchanger acts as a heat radiator that dissipates heat from the refrigerant.

The interior evaporator is an evaporator that evaporates the refrigerant circulating therethrough by exchanging heat with air before passing through the interior condenser to be blown into the vehicle interior, in the air-cooling mode, the dehumidification-heating mode, and the like. In this way, the interior evaporator exhibits the heat absorption function to cool the air, which is to be blown into the vehicle interior.

The accumulator is a gas-liquid separator that separates the refrigerant flowing into its inside, into gas and liquid phases to store therein an excess refrigerant within the cycle. A gas-phase refrigerant outlet of the accumulator is connected to a suction port side of the compressor. Thus, the accumulator serves to suppress the drawing of the liquid-phase refrigerant into the compressor and prevent liquid compression by the compressor.

In the related art, the accumulator is disposed on a refrigerant outlet side of the interior evaporator and a refrigerant suction side of the compressor.

Patent Document 2 describes a vehicle refrigeration cycle device that includes a chiller, a cooler core, and a coolant pump.

The chiller is a heat exchanger that cools a coolant by exchanging heat between the coolant and the low-pressure side refrigerant in the refrigeration cycle. The cooler core is a heat exchanger that cools and dehumidifies air to be blown into the vehicle interior by exchanging heat between the coolant cooled by the chiller and air to be blown into the vehicle interior. The coolant pump draws and discharges the coolant circulating between the chiller and the cooler core.

The vehicle refrigeration cycle device described in Patent Document 2 also includes a heater core and a radiator. The heater core is a heat exchanger that heats the air that has passed through the cooler core to be blown into the vehicle interior, by using the high-pressure side refrigerant in the refrigeration cycle as a heat source. The radiator is a heat exchanger that exchanges heat between the coolant cooled by the chiller and the outside air.

The coolant cooled by the low-pressure side refrigerant in the refrigeration cycle absorbs heat from the outside air in the radiator and also absorbs heat from the air, which is to be blown into the vehicle interior, in the cooler core. The air having its heat absorbed in the cooler core is heated by the heater core using the high-pressure side refrigerant of the refrigeration cycle as a heat source so that the dehumidification and heating can be performed.

RELATED ART DOCUMENT

Patent Documents

[Patent Document 1] Japanese Unexamined Patent Application Publication No. 2012-225637
[Patent Document 2] Japanese Unexamined Patent Application Publication No. 2015-013639

SUMMARY OF INVENTION

According to the studies by the inventors of the present application, in the prior art of Patent Document 1 described above, it is necessary to increase the amount of heat absorbed by the refrigerant from the outside air in the exterior heat exchanger by lowering the pressure of the refrigerant in the exterior heat exchanger, in order to sufficiently ensure the heating performance of the interior condenser in the air-heating mode or the like.

However, if the pressure of the refrigerant in the exterior heat exchanger becomes equal to or lower than a certain pressure, condensed water generated at the surface of the interior evaporator is frozen to form frost. Consequently, the volume of air passing through the interior evaporator is decreased, thus failing to obtain a heat exchange capacity required by the interior evaporator.

As a countermeasure to this, it is proposed to provide a bypass flow passage and an evaporation pressure adjustment valve. In the bypass flow passage, the refrigerant flows in parallel with the interior evaporator. The evaporation pressure adjustment valve adjusts an evaporation pressure by alternately switching between a state in which the refrigerant flows to the interior evaporator side and a state in which the refrigerant flows to the bypass flow passage side. The bypass flow passage and the evaporation pressure adjustment valve are considered to suppress the reduction of the evaporation pressure to thereby prevent formation of frost.

However, with such a countermeasure, when the refrigerant flows through the interior evaporator, if the flow rate of a refrigerant flowing through the interior evaporator is reduced, the flow rate of a refrigerant flowing through the exterior heat exchanger is also reduced, so that the heating performance of the interior condenser is more likely to be degraded.

The present disclosure has been made in view of the foregoing matter. It is a first object of the present disclosure to increase the amount of heat absorption from the outside air by further reducing the pressure of a refrigerant in a heat exchanger for exchanging heat between the refrigerant and the outside air as well as to prevent the formation of frost in a heat exchanger for cooling air.

In the related art described in the above-mentioned Patent Document 1, the accumulator also has the function of returning the refrigerant oil in the refrigerant to the compressor. However, as the accumulator is disposed on the refrigerant outlet side of the interior evaporator as well as on the refrigerant suction side of the compressor, the refrigerant and refrigerant oil in the accumulator is more likely to have a low temperature and a low pressure.

Consequently, viscosities of the refrigerant and the refrigerant oil in the accumulator become larger, hence making it difficult to return the refrigerant oil to the compressor. To return a desired amount of the refrigerant oil, it is necessary to increase the amount of refrigerant oil in the refrigerant. Meanwhile, in a refrigerant mode where the low-pressure side refrigerant pressure becomes higher, a return amount of the refrigerant oil becomes excessive, thus degrading air-cooling performance.

As the refrigerant in the accumulator becomes a low temperature and a low pressure, the pressure loss of the refrigerant in the accumulator becomes significant. In particular, in the air-heating mode where the pressure of the low-pressure refrigerant becomes lower, a pressure loss of the refrigerant becomes significant. Consequently, the air-heating performance would be degraded.

The present disclosure has been made in view of the foregoing matter. It is a second object of the present disclosure to reduce a pressure loss of the refrigerant in a refrigerant reservoir while improving the dischargeability of a refrigerant oil from the refrigerant reservoir.

In the related art described in the above-mentioned Patent Document 2, when frost may possibly be formed at a cooler core, a coolant pump is stopped to halt the heat exchange at the cooler core, thereby preventing the formation of frost.

At this time, in a coolant outlet of the chiller, the temperature of the coolant becomes equal to or lower than an outside air temperature, whereas in a heat exchanging portion of the cooler core, the temperature of the coolant becomes equal to the inside air temperature or the outside air temperature. That is, there is a difference in temperature of the coolant between the chiller and the cooler core. Therefore, even though the coolant pump is stopped, the low-temperature coolant in the chiller is gradually moved to the cooler core by convection. In such a case, if blowing toward the cooler core continues, unnecessary heat exchange will take place, so that the formation of frost at the cooler core cannot be prevented satisfactorily.

The present disclosure has been made in view of the foregoing matter. It is a third object of the present disclosure to suppress the movement of the coolant between the chiller and the cooler core even when circulation of a heat medium between the chiller and the cooler core is halted.

In the related art of Patent Document 2 described above, when dehumidifying and heating is performed, the rotational speed of the compressor is increased to raise the temperature of air blown from the heater core. However, if the rotational speed of the compressor is increased, frost may be formed in the cooler core.

Specifically, when the rotational speed of the compressor is elevated, the low-pressure side refrigerant pressure in the refrigeration cycle is further reduced to decrease the temperature of the coolant cooled by the chiller, so that the temperature of the refrigerant flowing into the cooler core is also decreased. As a result, once the surface temperature of the cooler core becomes equal to or lower than 0° C., moisture in the air is frozen at a surface of the cooler core to become ice, which adheres to the surface, thus inhibiting the circulation of air in the cooler core.

The present disclosure has been made in view of the foregoing matter. It is a fourth object of the present disclosure to achieve both ensuring the temperature of air blown into the vehicle interior and preventing the formation of frost in a cooler core.

A refrigeration cycle device according to a first aspect of the present disclosure includes: a compressor that draws and discharges a refrigerant; a high-pressure side heat exchanger that dissipates heat from the high-pressure refrigerant discharged from the compressor; a first decompression portion that decompresses the refrigerant flowing out of the high-pressure side heat exchanger; a refrigerant outside-air heat exchanger that exchanges heat between the refrigerant flowing out of the first decompression portion and outside air; a second decompression portion that decompresses the refrigerant flowing out of the refrigerant outside-air heat exchanger; a low-pressure side heat exchanger arranged in series with the refrigerant outside-air heat exchanger in a flow of the refrigerant, the low-pressure side heat exchanger being configured to exchange heat between the low-pressure refrigerant decompressed by at least one of the first decompression portion and the second decompression portion, and a heat medium to cool the heat medium; a cooler core that exchanges heat between the heat medium cooled by the low-pressure side heat exchanger and air to be blown into a vehicle interior to cool the air; and a controller configured to switch between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion.

Thus, the controller adjusts an amount of decompression in each of the first decompression portion and the second decompression portion, thereby making it possible to switch between the heat absorption mode and the heat dissipation mode. Accordingly, such a simple configuration can switch between the heat absorption mode and the heat dissipation mode.

As the heat medium is interposed between the low-pressure side heat exchanger and the cooler core, the temperature of the heat medium flowing into the cooler core becomes lower than the temperature of air cooled by the cooler core, and the temperature of the refrigerant flowing into the low-pressure side heat exchanger becomes lower than the temperature of the heat medium flowing into the cooler core.

Accordingly, the temperature of the refrigerant in the low-pressure side heat exchanger can be lowered, as compared to in a structure where an interior evaporator directly exchanges heat between the refrigerant and the air. As a result, the pressure of the refrigerant in the low-pressure side heat exchanger can also be lowered.

Thus, the pressure of the refrigerant in the refrigerant outside-air heat exchanger is made lower, thereby making it possible to achieve both increasing the amount of heat absorption of the refrigerant from the outside air in the refrigerant outside-air heat exchanger and preventing the formation of frost in a cooler core.

A refrigeration cycle device according to a second aspect of the present disclosure includes: a compressor that draws and discharges a refrigerant; a high-pressure side heat exchanger that dissipates heat from the high-pressure refrigerant discharged from the compressor; a first decompression portion that decompresses the refrigerant flowing out of the high-pressure side heat exchanger; a refrigerant outside-air heat exchanger that exchanges heat between the refrigerant flowing out of the first decompression portion and outside air; a second decompression portion that decompresses the refrigerant flowing out of the refrigerant outside-air heat exchanger; a low-pressure side heat exchanger that absorbs heat into the low-pressure refrigerant decompressed by at least one of the first decompression portion and the second decompression portion; a controller that switches between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion; and a refrigerant reservoir that stores the refrigerant heat-exchanged in the high-pressure side heat exchanger during the heat absorption mode and stores the refrigerant heat-exchanged in the refrigerant outside-air heat exchanger during the heat dissipation mode.

Thus, the refrigerant reservoir can be provided on the high-pressure side of the cycle in both the heat absorption mode and the heat dissipation mode. In other words, the refrigeration cycle can serve as a receiver cycle in both the heat absorption mode and the heat dissipation mode.

Consequently, the viscosity of each of the refrigerant and refrigerant oil in the refrigerant reservoir is reduced, as compared to an accumulator cycle in which a refrigerant reservoir is provided on the low-pressure side of the cycle, thereby making it possible to reduce the pressure loss of the refrigerant and to improve the dischargeability of the refrigerant oil.

A refrigeration cycle device according to a third aspect of the present disclosure includes: a compressor that draws and discharges a refrigerant; a high-pressure side heat exchanger that dissipates heat from the high-pressure refrigerant discharged from the compressor; a decompression portion that decompresses the refrigerant flowing out of the high-pressure side heat exchanger; a low-pressure side heat exchanger that exchanges heat between the low-pressure refrigerant decompressed in the decompression portion and a heat medium to cool the heat medium; a cooler core including a heat exchanging portion that exchanges heat between the heat medium cooled by the low-pressure side heat exchanger and air to cool the air; a heat-medium pump that draws and discharges the heat medium and causes the heat medium to circulate between the low-pressure side heat exchanger and the cooler core; and a blower that blows the air to the cooler core. The low-pressure side heat exchanger has an inlet and an outlet for the heat medium, and the heat exchanging portion is disposed at a higher position in the gravity direction than at least one of the inlet and the outlet.

Thus, the low-temperature heat medium in the low-pressure side heat exchanger and the high-temperature heat medium in the cooler core can be suppressed from being interchanged with each other due to a convection caused by a temperature difference between these heat media, when the circulation of the heat medium is stopped between the low-pressure side heat exchanger and the cooler core.

A refrigeration cycle device according to a fourth aspect of the present disclosure includes: a compressor that draws and discharges a refrigerant; a high-pressure side heat exchanger that dissipates heat from the high-pressure refrigerant discharged from the compressor; a decompression portion that decompresses the refrigerant flowing out of the high-pressure side heat exchanger; a low-pressure side heat exchanger that exchanges heat between the low-pressure refrigerant decompressed in the decompression portion and a heat medium to cool the heat medium; a cooler core including a heat exchanging portion that exchanges heat between air and the heat medium cooled by the low-pressure side heat exchanger to cool the air; a heat-medium pump that draws and discharges the heat medium and causes the heat medium to circulate between the low-pressure side heat exchanger and the cooler core; a blower that blows the air to the cooler core; and a heat-medium flow passage portion that forms a flow passage for the heat medium between the low-pressure side heat exchanger and the cooler core. The low-pressure side heat exchanger has an inlet and an outlet for the heat medium, and at least a part of the heat-medium flow passage portion is disposed at a lower position in the gravity direction than the heat exchanging portion.

Thus, the same functions and effects as those of the refrigeration cycle device in the above-mentioned third aspect can be exhibited.

A refrigeration cycle device according to a fifth aspect of the present disclosure includes: a compressor that draws and discharges a refrigerant; a high-pressure side heat exchanging portion that exchanges heat between the high-pressure refrigerant discharged from the compressor and air to be blown into a vehicle interior to heat the air; a high-pressure side heat exchanger that dissipates heat from the high-pressure refrigerant discharged from the compressor; a decompression portion that decompresses the refrigerant flowing out of the high-pressure side heat exchanger; a refrigerant outside-air heat exchanger that exchanges heat between the refrigerant decompressed by the decompression portion and outside air; a low-pressure side heat exchanger that exchanges heat between the refrigerant flowing out of the refrigerant outside-air heat exchanger and a heat medium to cool the heat medium; a cooler core that exchanges heat between the heat medium cooled by the low-pressure side heat exchanger and air to be blown into a vehicle interior to cool the air; a vehicle-mounted device that generates heat during operation, the vehicle-mounted device being configured to cause the generated heat to be absorbed into the heat medium cooled by the low-pressure side heat exchanger; a flow-rate adjustment portion that adjusts a flow rate of the heat medium flowing to the cooler core and a flow rate of the heat medium flowing to the vehicle-mounted device; and a controller that performs frost suppression control to suppress frost at the cooler core by controlling the flow-rate adjustment portion so as to suppress the flow rate of the heat medium flowing through the cooler core. The controller controls the flow-rate adjustment portion to cause the heat medium to flow to the vehicle-mounted device when performing the frost suppression control.

Thus, the frost suppression control can be performed to suppress the formation of frost at the cooler core. When the frost suppression control is performed, the heat medium flows to the vehicle-mounted device, so that heat can be absorbed from the vehicle-mounted device. Consequently, even when the amount of heat absorbed from the cooler core is decreased by performing the frost suppression control, such a decrease of the heat absorption amount can be compensated for by the amount of heat absorbed from the vehicle-mounted device, thus ensuring an air blowing temperature to the vehicle interior.

Therefore, the refrigeration cycle device can achieve both ensuring the air blowing temperature to the vehicle interior and preventing the formation of frost at the cooler core.

DETAILED DESCRIPTION

Figure 1:
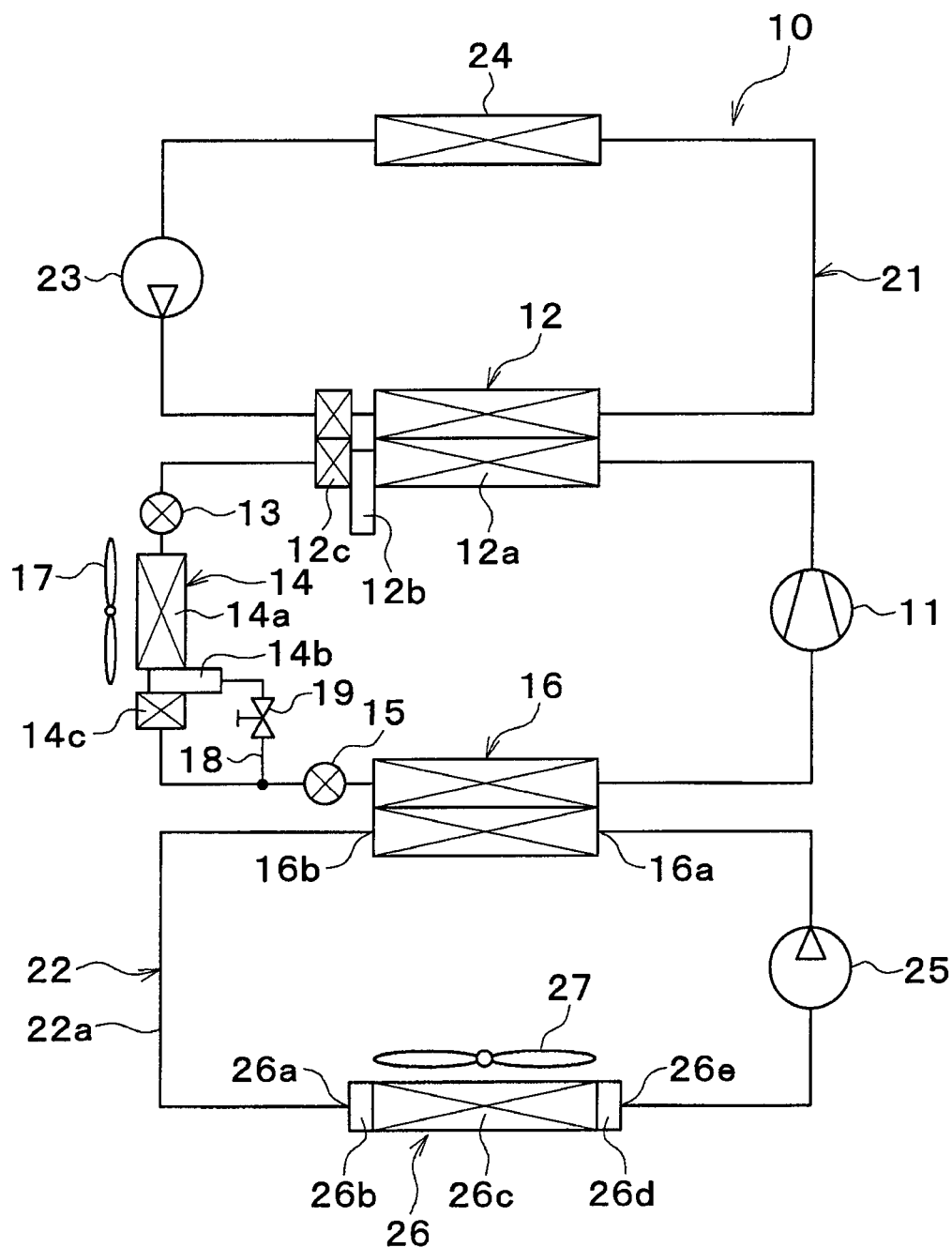
FIG. 1 is an entire configuration diagram of a refrigeration cycle device in a first embodiment.

Hereinafter, embodiments will be described with reference to the accompanying drawings. In the respective embodiments below, the same or equivalent parts are indicated by the same reference characters throughout the figures.

First Embodiment

A refrigeration cycle device 10 shown in FIG. 1 is a vehicle refrigeration cycle device used for adjusting the temperature of an interior space of a vehicle to an appropriate temperature. In the present embodiment, the refrigeration cycle device 10 is applied to a hybrid vehicle that obtains a driving force for traveling from both an engine (in other words, an internal combustion engine) and a traveling electric motor.

The hybrid vehicle in the present embodiment is configured as a plug-in hybrid vehicle that can charge a battery mounted on the vehicle (in other words, a vehicle-mounted battery) with power supplied from an external power source (in other words, a commercial power source), when the vehicle is stopped. For example, a lithium ion battery can be used as the battery.

The driving force output from the engine is used not only to cause the vehicle to travel, but also to operate a power generator. The power generated by the power generator and the power supplied from the external power source can be stored in the battery. The power stored in the battery is supplied not only to the traveling electric motor, but also to various vehicle-mounted devices, including electric components configuring the refrigeration cycle device 10.

The refrigeration cycle device 10 is a vapor compression refrigerating equipment that includes a compressor 11, a high-pressure side heat exchanger 12, a first expansion valve 13, an exterior heat exchanger 14, a second expansion valve 15, and a low-pressure side heat exchanger 16. The refrigeration cycle device 10 in the present embodiment forms a subcritical refrigeration cycle in which a high-pressure side refrigerant pressure does not exceed the critical pressure of the refrigerant, using a fluorocarbon refrigerant as the refrigerant.

The compressor 11 is an electric compressor driven by power supplied from a battery or a variable displacement compressor driven by a belt. The compressor 11 draws, compresses, and discharges the refrigerant in the refrigeration cycle device 10.

The high-pressure side heat exchanger 12 is a condenser that condenses a high-pressure side refrigerant by exchanging heat between the high-pressure side refrigerant discharged from the compressor 11 and the coolant in a high-temperature coolant circuit 21.

The coolant in the high-temperature coolant circuit 21 is a fluid serving as a heat medium. The coolant in the high-temperature coolant circuit 21 is the high-temperature heat medium. In the present embodiment, the coolant suitable for use in the high-temperature coolant circuit 21 is a liquid containing at least ethylene glycol, dimethylpolysiloxane, or a nanofluid, or an antifreezing fluid.

The first expansion valve 13 is a first decompression portion that decompresses and expands the liquid-phase refrigerant flowing out of the high-pressure side heat exchanger 12. The first expansion valve 13 is an electric variable throttle mechanism and has a valve body and an electric actuator. The valve body is configured to be capable of changing a passage opening degree (in other words, a throttle opening degree) of the refrigerant passage. The electric actuator has a stepping motor for changing the throttle opening degree of the valve body.

The first expansion valve 13 is configured of a variable throttle mechanism with a full-opening function that fully opens the refrigerant passage when its throttle opening degree is fully opened. That is, the first expansion valve 13 can prevent the decompression function of the refrigerant from being exerted by fully opening the refrigerant passage. The first expansion valve 13 has its operation controlled by a control signal output from a controller 30.

The exterior heat exchanger 14 is a refrigerant outside-air heat exchanger that exchanges heat between the refrigerant flowing out of the first expansion valve 13 and the outside air. The exterior heat exchanger 14 receives the outside air blown by an exterior blower 17.

The exterior blower 17 is a blowing portion that blows the outside air toward the exterior heat exchanger 14. The exterior blower 17 is an electric blower that includes a fan driven by an electric motor. The exterior heat exchanger 14 and the exterior blower 17 are disposed at the forefront of the vehicle. Thus, traveling air is allowed to hit the exterior heat exchanger 14 during traveling of the vehicle.

When the temperature of the refrigerant circulating through the exterior heat exchanger 14 is lower than the outside air temperature, the exterior heat exchanger 14 functions as a heat absorber that absorbs heat from the outside air into the refrigerant. When the temperature of the refrigerant circulating through the exterior heat exchanger 14 is higher than the outside air temperature, the exterior heat exchanger 14 functions as a heat radiator that dissipates heat from the refrigerant into the outside air.

The second expansion valve 15 is a second decompression portion that decompresses and expands the liquid-phase refrigerant flowing out of the exterior heat exchanger 14. The second expansion valve 15 is an electric variable throttle mechanism and has a valve body and an electric actuator. The valve body is configured to be capable of changing a passage opening degree (in other words, a throttle opening degree) of the refrigerant passage. The electric actuator has a stepping motor for changing the throttle opening degree of the valve body.

The second expansion valve 15 is configured of a variable throttle mechanism with a full-opening function that fully opens the refrigerant passage when its throttle opening degree is fully opened. That is, the second expansion valve 15 can prevent the decompression function of the refrigerant from being exerted by fully opening the refrigerant passage. The second expansion valve 15 has its operation controlled by a control signal output from the controller 30.

The throttle opening degrees of the first expansion valve 13 and the second expansion valve 15 are changed to switch between a heat absorption mode and a heat dissipation mode. The heat absorption mode is an operation mode in which the exterior heat exchanger 14 causes the refrigerant to absorb heat. The heat dissipation mode is an operation mode in which the exterior heat exchanger 14 causes the refrigerant to dissipate heat.

The low-pressure side heat exchanger 16 is an evaporator that evaporates a low-pressure refrigerant by exchanging heat between the low-pressure refrigerant flowing out of the second expansion valve 15 and the coolant in the low-temperature coolant circuit 22. The gas-phase refrigerant evaporated at the low-pressure side heat exchanger 16 is drawn into and compressed by the compressor 11.

The coolant in the low-temperature coolant circuit 22 is a fluid serving as a heat medium. The coolant in the low-temperature coolant circuit 22 is the low-temperature heat medium. In the present embodiment, the coolant suitable for use in the low-temperature coolant circuit 22 is a liquid containing at least ethylene glycol, dimethylpolysiloxane, or a nanofluid, or an antifreezing fluid.

The high-pressure side heat exchanger 12 has a heat exchanging portion 12a. The heat exchanging portion 12a of the high-pressure side heat exchanger 12 exchanges heat between the refrigerant discharged from the compressor 11 and the coolant in the high-temperature coolant circuit 21. In the high-pressure side heat exchanger 12, a modulator 12b and a subcooling portion 12c are integrated together. The modulator 12b of the high-pressure side heat exchanger 12 is the first refrigerant reservoir that stores therein an excess liquid-phase refrigerant, while separating the refrigerant flowing out of the heat exchanging portion 12a of the high-pressure side heat exchanger 12, into gas and liquid phases. The subcooling portion 12c of the high-pressure side heat exchanger 12 is a heat-absorption mode subcooling portion that subcools the liquid-phase refrigerant by exchanging heat between the liquid-phase refrigerant flowing out of the modulator 12b of the high-pressure side heat exchanger 12 and the coolant in the high-temperature coolant circuit 21 during the heat absorption mode.

The exterior heat exchanger 14 has a heat exchanging portion 14a. In the exterior heat exchanger 14, a modulator 14b, and a subcooling portion 14c are integrated together. The heat exchanging portion 14a of the exterior heat exchanger 14 exchanges heat between the refrigerant flowing out of the first expansion valve 13 and the outside air. The modulator 14b of the exterior heat exchanger 14 is the second refrigerant reservoir that stores therein an excess liquid-phase refrigerant, while separating the refrigerant flowing out of the heat exchanging portion 14a of the exterior heat exchanger 14, into gas and liquid phases. The subcooling portion 14c of the exterior heat exchanger 14 is a heat-dissipation mode subcooling portion that subcools the liquid-phase refrigerant by exchanging heat between the liquid-phase refrigerant flowing out of the modulator 14b of the exterior heat exchanger 14 and the outside air in the heat dissipation mode.

The modulator 14b of the exterior heat exchanger 14 is connected to a subcooling bypass flow passage 18. The subcooling bypass flow passage 18 is a bypass portion in which the refrigerant having flowed through the modulator 14b of the exterior heat exchanger 14 flows bypassing the subcooling portion 14c.

A subcooling bypass on/off valve 19 is disposed in the subcooling bypass flow passage 18. The subcooling bypass on/off valve 19 is a bypass opening-degree adjustment portion that adjusts an opening degree of the subcooling bypass flow passage 18. The subcooling bypass on/off valve 19 is an electromagnetic valve and is controlled by the controller 30.

The high-pressure side heat exchanger 12, a high-temperature side pump 23, and a heater core 24 are disposed in the high-temperature coolant circuit 21. The low-pressure side heat exchanger 16, a low-temperature side pump 25, and a cooler core 26 are disposed in the low-temperature coolant circuit 22.

The high-temperature side pump 23 and the low-temperature side pump 25 are heat medium pumps that draw and discharge the coolant. Each of the high-temperature side pump 23 and the low-temperature side pump 25 is an electric pump. The high-temperature side pump 23 is a high-temperature side flow-rate adjustment portion that adjusts the flow rate of the coolant circulating in the high-temperature coolant circuit 21. The low-temperature side pump 25 is a low-temperature side flow-rate adjustment portion that adjusts the flow rate of the coolant circulating in the low-temperature coolant circuit 22.

The heater core 24 is a high-temperature side heat medium heat exchanger that exchanges heat between the coolant in the high-temperature coolant circuit 21 and air to be blown into the vehicle interior to thereby heat the air to be blown into the vehicle interior. In the heater core 24, the coolant undergoes sensible heat change to dissipate heat into the air, which is to be blown into the vehicle interior. That is, in the heater core 24, the coolant does not change its phase and remains in the liquid phase even though the coolant dissipates heat into the air to be blown into the vehicle interior.

The high-pressure side heat exchanger 12 and the heater core 24 are high-pressure side heat exchanging portions that exchange heat between the high-pressure refrigerant discharged from the compressor 11 and air to be blown into the vehicle interior via the coolant, thereby heating the air to be blown into the vehicle interior. The high-pressure side heat exchanging portion may be a heat exchanger that exchanges heat between the high-pressure refrigerant discharged from the compressor 11 and the air to be blown into the vehicle interior with no coolant interposed therebetween, thereby heating the air to be blown into the vehicle interior.

The cooler core 26 is a low-temperature side heat medium heat exchanger that exchanges heat between the coolant in the low-temperature coolant circuit 22 and air to be blown into the vehicle interior to thereby cool the air to be blown into the vehicle interior. In the cooler core 26, the coolant undergoes sensible heat change to absorb heat from the air, which is to be blown into the vehicle interior. That is, in the cooler core 26, the coolant does not change its phase and remains in the liquid phase even though the coolant absorbs heat from the air to be blown into the vehicle interior.

The cooler core 26 and the heater core 24 are accommodated in an air-conditioning casing (not shown). The air-conditioning casing is an air passage formation member that forms an air passage.

The heater core 24 is disposed on the air-flow downstream side of the cooler core 26 in the air passage within the air-conditioning casing. The air-conditioning casing is disposed in the vehicle interior space.

An inside/outside air switching box (not shown) and an interior blower 27 are disposed in the air-conditioning casing. The inside/outside air switching box is an inside/outside air switching portion that switches between the inside air and the outside air to introduce the switched air to the air passage within the air-conditioning casing. The interior blower 27 draws in and blows the inside air and the outside air which are introduced into the air passage within the air-conditioning casing through the inside/outside air switching box.

An air mix door (not shown) is disposed between the cooler core 26 and the heater core 24 in the air passage within the air-conditioning casing. The air mix door adjusts the air volume ratio between the cold air flowing into the heater core 24 and the cold air flowing while bypassing the heater core 24, among the cold air passing through the cooler core 26.

The air mix door is a rotary door that has a rotary shaft rotatably supported with respect to the air-conditioning casing and a door base portion coupled to the rotary shaft. By regulating the opening degree position of the air mix door, the temperature of the conditioned air blown from the air-conditioning casing into the vehicle interior can be adjusted to a desired temperature.

The rotary shaft of the air mix door is driven by a servo motor. The operation of the servo motor is controlled by the controller 30.

The cooler core 26 has a coolant inlet 26a, a distribution tank 26b, a heat exchanging portion 26c, a collection tank 26d, and a coolant outlet 26e.

The coolant inlet 26a causes the coolant flowing out of the low-pressure side heat exchanger 16 to flow into the distribution tank 26b. The distribution tank 26b distributes the coolant to a plurality of coolant tubes in the heat exchanging portion 26c. The heat exchanging portion 26c has a plurality of coolant tubes and exchanges heat between the coolant and the air to be blown into the vehicle interior. The collection tank 26d collects the coolants having flowed through the plurality of coolant tubes of the heat exchanging portion 26c. The coolant outlet 26e causes the coolant to flow out of the collection tank 26d toward the coolant suction side of the low-temperature side pump 25.

The low-pressure side heat exchanger 16 has a coolant inlet 16a and a coolant outlet 16b. The coolant discharged from the low-temperature side pump 25 flows into the low-pressure side heat exchanger 16 via the coolant inlet 16a. The coolant that is heat-exchanged in the low-pressure side heat exchanger 16 flows out to the side of the coolant inlet 26a of the cooler core 26 through the coolant outlet 16b.

The heat exchanging portion 26c of the cooler core 26 is disposed at a higher position in the gravity direction than at least one of the coolant inlet 16a and the coolant outlet 16b of the low-pressure side heat exchanger 16.

At least a part of the low-temperature coolant flow passage 22a in the low-temperature coolant circuit 22, through which the coolant flows, is disposed at a lower position in the gravity direction than the heat exchanging portion 26c of the cooler core 26. The low-temperature coolant flow passage 22a is a heat-medium passage portion through which the coolant flows between the low-pressure side heat exchanger 16 and the cooler core 26.

Figure 2:
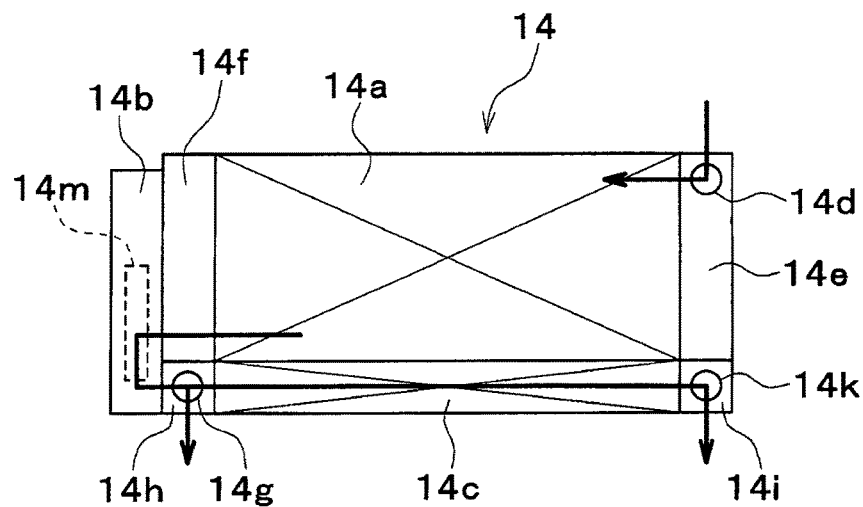
FIG. 2 is a schematic diagram showing an exterior heat exchanger in the first embodiment.

As shown in FIG. 2, the exterior heat exchanger 14 has a refrigerant inlet 14d, a heat-exchanging-portion distribution tank 14e, a heat-exchanging-portion collection tank 14f, a bypass discharge port 14g, a subcooling-portion distribution tank 14h, a subcooling-portion collection tank 14i, and a refrigerant outlet 14k.

The refrigerant inlet 14d is provided in the heat-exchanging-portion distribution tank 14e. The heat-exchanging-portion distribution tank 14e distributes the coolant to a plurality of refrigerant coolant tubes in the heat exchanging portion 14a. The heat-exchanging-portion collection tank 14f collects the coolants having flowed through the plurality of coolant tubes of the heat exchanging portion 14a.

The bypass discharge port 14g is connected to a pipe that forms the subcooling bypass flow passage 18. The bypass discharge port 14g is provided in the subcooling-portion distribution tank 14h. The subcooling-portion distribution tank 14h distributes the coolant to a plurality of refrigerant tubes in the subcooling portion 14c. The subcooling-portion collection tank 14i collects the refrigerants having flowed through the plurality of refrigerant tubes of the subcooling portion 14c. The refrigerant outlet 14k is provided in the subcooling-portion collection tank 14i. A filter 14m is accommodated in the modulator 14b.

As indicated by the arrows in FIG. 2, the refrigerant flowing thereinto from the refrigerant inlet 14*d* flows through the heat-exchanging-portion distribution tank 14*e*, the heat exchanging portion 14*a*, the heat-exchanging-portion collection tank 14*f*, the modulator 14*b*, the subcooling-portion distribution tank 14*h*, the subcooling portion 14*c*, and the subcooling-portion collection tank 14*i* in this order, and then flows out of the refrigerant outlet 14*k*.

When the subcooling bypass on/off valve 19 opens the subcooling bypass flow passage 18, the refrigerant flowing into the subcooling-portion distribution tank 14*h* flows out of the bypass discharge port 14*g* to the subcooling bypass passage 18.

Figure 3:
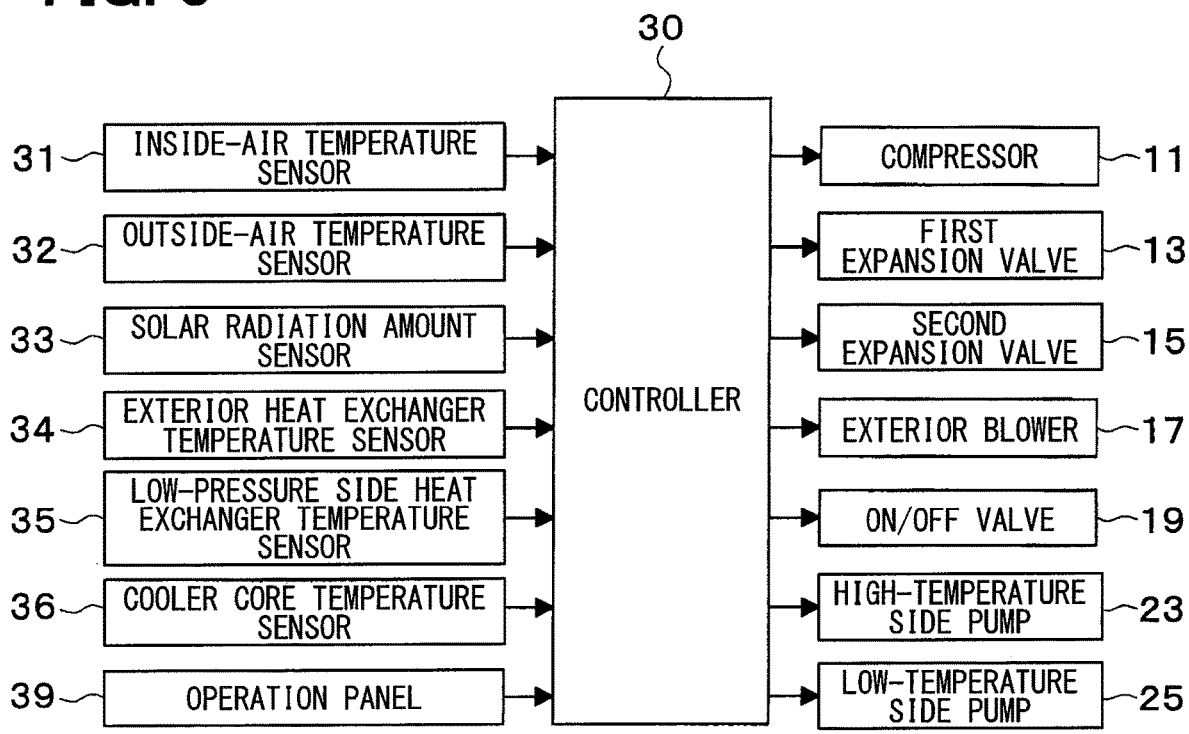
FIG. 3 is a block diagram showing an electric control unit of the refrigeration cycle device in the first embodiment.

Next, an electric controller of the refrigeration cycle device 10 will be described with reference to FIG. 3. The controller 30 is configured of a known microcomputer, including a CPU, a ROM, and a RAM, and a peripheral circuit thereof. The controller 30 performs various computations and processing based on control programs stored in the ROM. Various control target devices are connected to the output side of the controller 30. The controller 30 is a control unit that controls the operations of various control target devices.

The control target devices controlled by the controller 30 include the compressor 11, the first expansion valve 13, the second expansion valve 15, the exterior blower 17, the subcooling bypass on/off valve 19, the high-temperature side pump 23, and the low-temperature side pump 25.

The software and hardware of the controller 30 for controlling the electric motor of the compressor 11 correspond to a refrigerant discharge capacity control unit. The software and hardware of the controller 30 for controlling the first expansion valve 13 correspond to a first throttle control unit. The software and hardware of the controller 30 for controlling the second expansion valve 15 correspond to a second throttle control unit.

The software and hardware of the controller 30 for controlling the exterior blower 17 correspond to an outside-air blowing capacity control unit. The software and hardware of the controller 30 for controlling the subcooling bypass on/off valve 19 correspond to a bypass opening degree control unit.

The software and hardware of the controller 30 for controlling the high-temperature side pump 23 correspond to a high-temperature side heat medium flow rate control unit. The software and hardware of the controller 30 for controlling the low-temperature side pump 25 correspond to a low-temperature side heat medium flow rate control unit.

The input side of the controller 30 is connected to a group of various sensors for air-conditioning control. The group of sensors includes an inside-air temperature sensor 31, an outside-air temperature sensor 32, a solar radiation amount sensor 33, an exterior heat exchanger temperature sensor 34, a low-pressure side heat exchanger temperature sensor 35, and a cooler-core temperature sensor 36.

The inside-air temperature sensor 31 detects a vehicle interior temperature Tr. The outside-air temperature sensor 32 detects an outside air temperature Tam. The solar radiation amount sensor 33 detects a solar radiation amount Ts in the vehicle interior. The exterior heat exchanger temperature sensor 34 detects a temperature of the exterior heat exchanger 14. For example, the exterior heat exchanger temperature sensor 34 detects a temperature of the refrigerant flowing into the exterior heat exchanger 14. The low-pressure side heat exchanger temperature sensor 35 detects a temperature of the coolant flowing out of the low-pressure side heat exchanger 16.

The cooler-core temperature sensor 36 detects the temperature of the cooler core 26. For example, the low-pressure side heat exchanger temperature sensor 35 detects the temperature of the coolant flowing out of the low-pressure side heat exchanger 16. For example, the cooler-core temperature sensor 36 is a fin thermistor that detects the temperature of heat exchange fins of the cooler core 26. The cooler-core temperature sensor 36 may be a temperature sensor that detects the temperature of the coolant flowing into the cooler core 26.

An operation panel 39 is connected to the input side of the controller 30. The operation panel 39 is disposed near a dashboard at the front of the vehicle cabin and operated by an occupant. The operation panel 39 is provided with various types of operation switches. Operation signals from various operation switches are input to the controller 30.

Various types of operation switches provided on the operation panel 39 include an air conditioner switch, and a temperature setting switch. The air conditioner switch sets whether or not the cooling of the ventilation air in the vehicle interior is performed by an interior air-conditioning unit. The temperature setting switch sets the preset temperature of the vehicle interior.

Next, the operation of the above-mentioned configuration will be described. The controller 30 switches an air-conditioning mode to any one of the air-heating mode, the air-cooling mode, a first dehumidification-heating mode, and a second dehumidification-heating mode based on a target air outlet temperature TAO and the like.

The target air outlet temperature TAO is a target temperature of air blown into the vehicle interior. The controller 30 calculates the target air outlet temperature TAO based on the following formula.

$$TAO = Kset \times Tset - Kr \times Tr - Kam \times Tam - Ks \times Ts + C$$

where Tset is a vehicle interior preset temperature set by the temperature setting switch on the operation panel 39; Tr is an inside air temperature detected by the inside-air temperature sensor 31; Tam is the outside air temperature detected by the outside-air temperature sensor 32; Ts is an amount of solar radiation detected by the solar radiation amount sensor 33; Kset, Kr, Kam, and Ks are control gains; and C is a constant for correction.

Next, the operations of the refrigeration cycle device in the air-heating mode, the air-cooling mode, the first dehumidification-heating mode, and the second dehumidification-heating mode will be described. Each of the air-heating mode and the second dehumidification-heating mode is a heat absorption mode in which the exterior heat exchanger 14 absorbs heat into the refrigerant. Each of the air-cooling mode and the first dehumidification-heating mode is a heat dissipation mode in which the exterior heat exchanger 14 dissipates heat from the refrigerant.

(Air-Heating Mode)

In the air-heating mode, the controller 30 sets the first expansion valve 13 in a throttle state and the second expansion valve 15 in the fully open state. In the air-heating mode, the controller 30 drives the high-temperature side pump 23, and stops the low-temperature side pump 25.

The controller 30 determines the operating states of various control target devices connected to the controller 30 (control signals output to respective control target devices), based on the target air outlet temperature TAO, detection signals from the sensor group, and the like.

A control signal to be output to the first expansion valve 13 is determined such that a subcooling degree of the refrigerant flowing into the first expansion valve 13 approaches a target subcooling degree previously set. The target subcooling degree is determined such that a coefficient of performance (so-called COP) of the cycle approaches its maximum value.

A control signal to be output to the servo motor of the air mix door (not shown) is determined such that the air mix door fully opens the air passage in the heater core 24, and that the whole flow of ventilation air having passed through the cooler core 26 passes through the air passage in the heater core 24.

Figure 4:
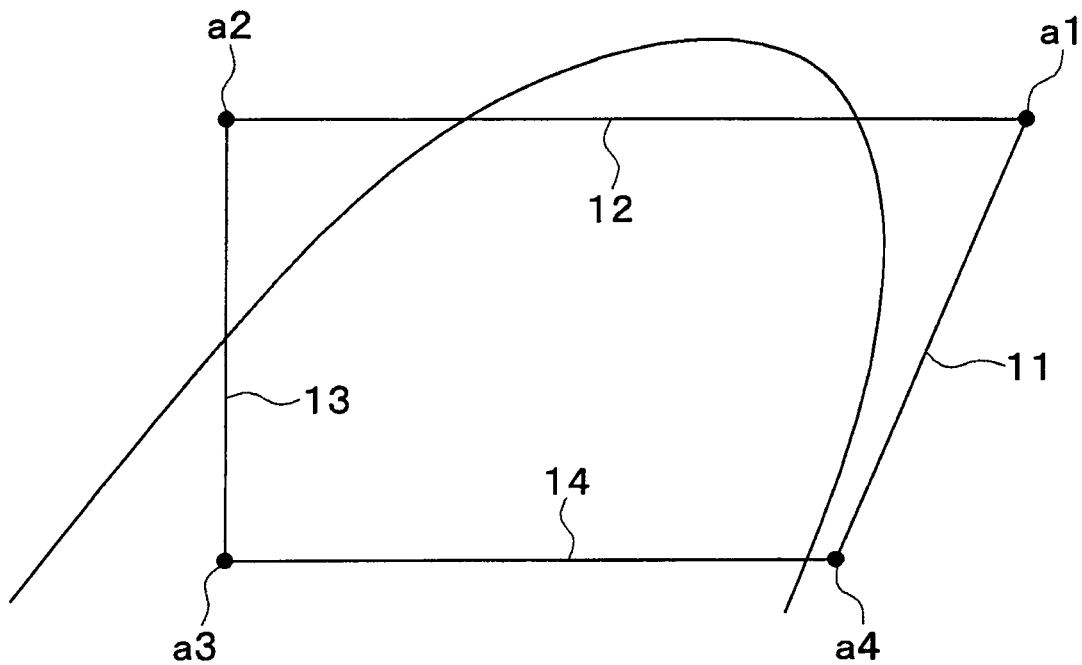
FIG. 4 is a Mollier chart showing the state of a refrigerant in an air-heating mode of the refrigeration cycle device in the first embodiment.

In the air-heating mode, the state of the refrigerant circulating in the cycle changes as illustrated in the Mollier chart of FIG. 4.

That is, as indicated by a1 point and a2 point in FIG. 4, the high-pressure refrigerant discharged from the compressor 11 flows into the high-pressure side heat exchanger 12 and exchanges heat with the coolant in the high-temperature coolant circuit 21 to dissipate the heat therefrom. In this way, the coolant in the high-temperature coolant circuit 21 is heated.

As indicated by the a2 point and a3 point in FIG. 4, the refrigerant flowing out of the high-pressure side heat exchanger 12 flows into the first expansion valve 13 to be decompressed into a low-pressure refrigerant. Then, as indicated by the a3 point and a4 point in FIG. 4, the low-pressure refrigerant decompressed in the first expansion valve 13 flows into the exterior heat exchanger 14 and absorbs heat from the outside air blown from a blower fan to evaporate itself.

The refrigerant flowing out of the exterior heat exchanger 14 flows into the second expansion valve 15. At this time, as the second expansion valve 15 is in the fully open state, the refrigerant flowing out of the exterior heat exchanger 14 flows into the low-pressure side heat exchanger 16 without being decompressed by the second expansion valve 15.

As the low-temperature side pump 25 is stopped, the coolant in the low-temperature coolant circuit 22 does not circulate through the low-pressure side heat exchanger 16. Thus, as indicated by the a4 point in FIG. 4, the low-pressure refrigerant flowing into the low-pressure side heat exchanger 16 hardly absorbs heat from the coolant in the low-temperature coolant circuit 22. Subsequently, as indicated by the a4 point and the a1 point in FIG. 4, the refrigerant flowing out of the low-pressure side heat exchanger 16 flows to the suction side of the compressor 11 to be decompressed again in the compressor 11.

In the high-pressure side heat exchanger 12, the modulator 12*b* separates the refrigerant condensed by the heat exchanging portion 12*a*, into gas and liquid phase refrigerants, and stores excess refrigerant therein. The liquid-phase refrigerant flowing out of the modulator 12*b* flows through the subcooling portion 12*c* to be subcooled.

In the air-heating mode, the controller 30 opens the subcooling bypass on/off valve 19. Thus, the refrigerant flowing out of the modulator 14*b* of the exterior heat exchanger 14 flows through the subcooling portion 14*c* of the exterior heat exchanger 14 and the subcooling bypass flow passage 18, thereby making it possible to reduce the pressure loss of the refrigerant in the subcooling portion 14*c* of the exterior heat exchanger 14.

As mentioned above, in the air-heating mode, heat of the high-pressure refrigerant discharged from the compressor 11 is dissipated at the high-pressure side heat exchanger 12 into the coolant in the high-temperature coolant circuit 21, and heat of the coolant in the high-temperature coolant circuit 21 is dissipated at the heater core 24 into the ventilation air in the vehicle interior, so that the heated ventilation air for the vehicle interior can be blown into the vehicle interior. Thus, the air-heating of the vehicle interior can be achieved.

(Air-Cooling Mode)

In the air-cooling mode, the controller 30 sets the first expansion valve 13 in the fully open state and the second expansion valve 15 in the throttle state. In the air-cooling mode, the controller 30 stops the high-temperature side pump 23, and drives the low-temperature side pump 25.

The controller 30 determines the operating states of various control target devices connected to the controller 30 (control signals output to respective control target devices) based on the target air outlet temperature TAO, detection signals from the sensor group, and the like.

A control signal to be output to the second expansion valve 15 is determined such that a subcooling degree of the refrigerant flowing into the second expansion valve 15 approaches a target subcooling degree previously set so as to make the COP close to the maximum value.

A control signal to be output to the servo motor of the air mix door (not shown) is determined such that the air mix door closes the air passage in the heater core 24, and that the whole flow of ventilation air having passed through the cooler core 26 flows while bypassing the heater core 24.

Figure 5:
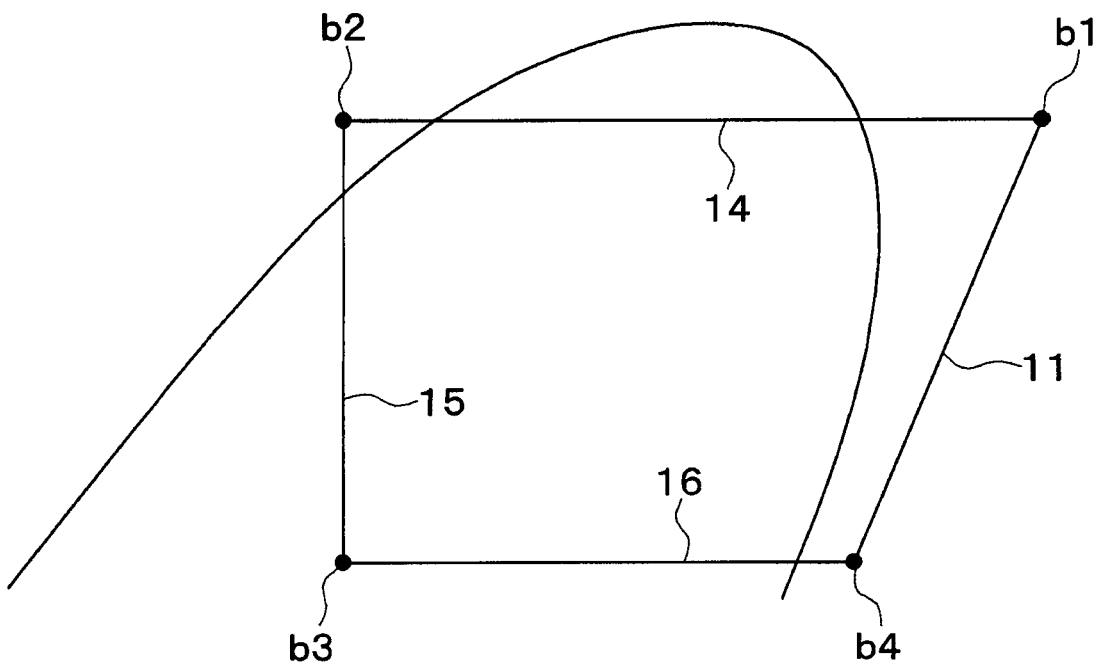
FIG. 5 is a Mollier chart showing the state of a refrigerant in an air-cooling mode of the refrigeration cycle device in the first embodiment.

In the refrigeration cycle device 10 of the air-cooling mode, the state of the refrigerant circulating in the cycle changes as illustrated in the Mollier chart of FIG. 5.

That is, as indicated by b1 point in FIG. 5, the high-pressure refrigerant discharged from the compressor 11 flows into the high-pressure side heat exchanger 12. As the high-temperature side pump 23 is stopped at this time, the coolant in the high-temperature coolant circuit 21 does not circulate through the high-pressure side heat exchanger 12. Thus, the refrigerant flowing into the high-pressure side heat exchanger 12 hardly exchanges heat with the coolant in the high-temperature coolant circuit 21 and flows out of the high-pressure side heat exchanger 12.

The refrigerant flowing out of the high-pressure side heat exchanger 12 flows into the first expansion valve 13. As the first expansion valve 13 fully opens the refrigerant passage at this time, the refrigerant flowing out of the high-pressure side heat exchanger 12 flows into the exterior heat exchanger 14 without being decompressed by the first expansion valve 13.

As indicated by the b1 point and b2 point in FIG. 5, the refrigerant flowing into the exterior heat exchanger 14 dissipates heat at the exterior heat exchanger 14 into the outside air blown by the blower fan.

As indicated by the b2 point and b3 point in FIG. 5, the refrigerant flowing out of the exterior heat exchanger 14 flows into the second expansion valve 15 to be decompressed and expanded into a low-pressure refrigerant. Then, as indicated by the b3 point and b4 point in FIG. 5, the low-pressure refrigerant decompressed in the second expansion valve 15 flows into the low-pressure side heat exchanger 16 and absorbs heat from the coolant in the low-temperature coolant circuit 22 to evaporate itself. Thus, the coolant in the low-temperature coolant circuit 22 is cooled, so that the ventilation air in the vehicle interior is cooled by the cooler core 26.

Subsequently, as indicated by the b4 point and the b1 point in FIG. 5, the refrigerant flowing out of the low-pressure side heat exchanger 16 flows to the suction side of the compressor 11 to be decompressed again in the compressor 11.

In the exterior heat exchanger 14, the modulator 14*b* separates the refrigerant condensed by the heat exchanging portion 14*a*, into gas and liquid phase refrigerants, and stores excess refrigerant therein. In the air-cooling mode, the controller 30 closes the subcooling bypass on/off valve 19. Thus, the liquid-phase refrigerant flowing out of the modulator 14b flows through the subcooling portion 14c to be subcooled.

As mentioned above, in the air-cooling mode, the ventilation air in the vehicle interior, cooled by the cooler core 26, can be blown into the vehicle interior. Thus, the air-cooling of the vehicle interior can be achieved.

(First Dehumidification-Heating Mode)

In the first dehumidification-heating mode, the controller 30 sets the first expansion valve 13 and the second expansion valve 15 in the throttle state. In the first dehumidification-heating mode, the controller 30 drives both the high-temperature side pump 23 and the low-temperature side pump 25.

The controller 30 determines the operating states of various control target devices connected to the controller 30 (control signals output to respective control target devices) based on the target air outlet temperature TAO, detection signals from the sensor group, and the like.

A control signal to be output to the servo motor of the air mix door (not shown) is determined such that the air mix door fully opens the air passage in the heater core 24, and that the whole flow of air having passed through the cooler core 26 passes through the air passage in the heater core 24.

In the first dehumidification-heating mode, the first expansion valve 13 and the second expansion valve 15 are set in the throttle state. Therefore, in the first dehumidification-heating mode, the state of the refrigerant circulating in the cycle changes as illustrated in the Mollier chart of FIG. 6.

Figure 6:
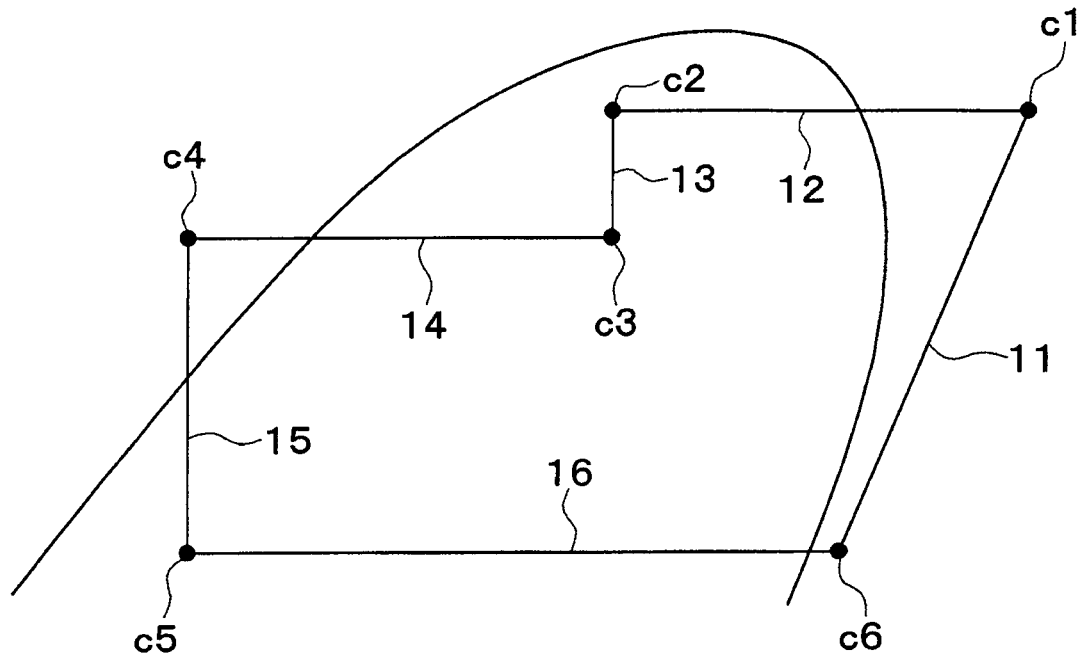
FIG. 6 is a Mollier chart showing the state of a refrigerant in a first dehumidification-heating mode of the refrigeration cycle device in the first embodiment.

That is, as indicated by c1 point and c2 point in FIG. 6, the high-pressure refrigerant discharged from the compressor 11 flows into the high-pressure side heat exchanger 12 and exchanges heat with the coolant in the high-temperature coolant circuit 21 to dissipate the heat therefrom. Thus, the coolant in the high-temperature coolant circuit 21 is heated.

As indicated by the c2 point and c3 point in FIG. 6, the refrigerant flowing out of the high-pressure side heat exchanger 12 flows into the first expansion valve 13 to be decompressed into an intermediate-pressure refrigerant. Then, as indicated by the c3 point and c4 point in FIG. 6, the intermediate-pressure refrigerant decompressed in the first expansion valve 13 flows into the exterior heat exchanger 14 and dissipates heat into the outside air blown from an exterior blower.

As indicated by the c4 point and c5 point in FIG. 6, the refrigerant flowing out of the exterior heat exchanger 14 flows into the second expansion valve 15 to be decompressed and expanded into a low-pressure refrigerant in the second expansion valve 15. Then, as indicated by the c5 point and c6 point in FIG. 6, the low-pressure refrigerant decompressed in the second expansion valve 15 flows into the low-pressure side heat exchanger 16 and absorbs heat from the coolant in the low-temperature coolant circuit 22 to evaporate itself. Thus, the coolant in the low-temperature coolant circuit 22 is cooled. Subsequently, as indicated by the c6 point and the c1 point in FIG. 6, the refrigerant flowing out of the low-pressure side heat exchanger 16 flows to the suction side of the compressor 11 to be decompressed again in the compressor 11.

As mentioned above, in the first dehumidification-heating mode, the ventilation air in the vehicle interior, cooled and dehumidified by the cooler core 26, can be heated by the heater core 24 and blown into the vehicle interior. Thus, the dehumidification-heating of the vehicle interior can be achieved.

As the first expansion valve 13 is in the throttle state in the first dehumidification-heating mode at this time, the temperature of the refrigerant flowing into the exterior heat exchanger 14 can be lowered, as compared to in the air-cooling mode. Therefore, a difference between the refrigerant temperature in the exterior heat exchanger 14 and the outside air temperature can be decreased to reduce the amount of heat dissipated from the refrigerant in the exterior heat exchanger 14.

As a result, the amount of heat dissipated from the refrigerant in the high-pressure side heat exchanger 12 can be increased without increasing the flow rate of circulation of the refrigerant that circulates in the cycle, as compared to in the air-cooling mode, so that the temperature of air blown from the heater core 24 can be increased more than in the air-cooling mode.

In the exterior heat exchanger 14, the modulator 14b separates the refrigerant condensed by the heat exchanging portion 14a, into gas and liquid phase refrigerants, and stores excess refrigerant therein. In the air-heating mode, the controller 30 closes the subcooling bypass on/off valve 19. Thus, the liquid-phase refrigerant flowing out of the modulator 14b of the exterior heat exchanger 14 flows through the subcooling portion 14c to be subcooled.

(Second Dehumidification-Heating Mode)

In the second dehumidification-heating mode, the controller 30 sets the first expansion valve 13 and the second expansion valve 15 in the throttle state. In the second dehumidification-heating mode, the controller 30 drives both the high-temperature side pump 23 and the low-temperature side pump 25.

The controller 30 determines the operating states of various control target devices connected to the controller 30 (control signals output to respective control target devices) based on the target air outlet temperature TAO, detection signals from the sensor group, and the like.

A control signal to be output to the servo motor of the air mix door (not shown) is determined such that the air mix door fully opens the air passage in the heater core 24, and that the whole flow of air having passed through the cooler core 26 passes through the air passage in the heater core 24.

In the second dehumidification-heating mode, the first expansion valve 13 is set in a throttle state where its throttle opening degree is decreased, as compared to in the first dehumidification-heating mode, while the second expansion valve 15 is set in another throttle state where its throttle opening degree is increased, as compared to in the first dehumidification-heating mode. Therefore, in the second dehumidification-heating mode, the state of the refrigerant circulating in the cycle changes as illustrated in the Mollier chart of FIG. 7.

Figure 7:
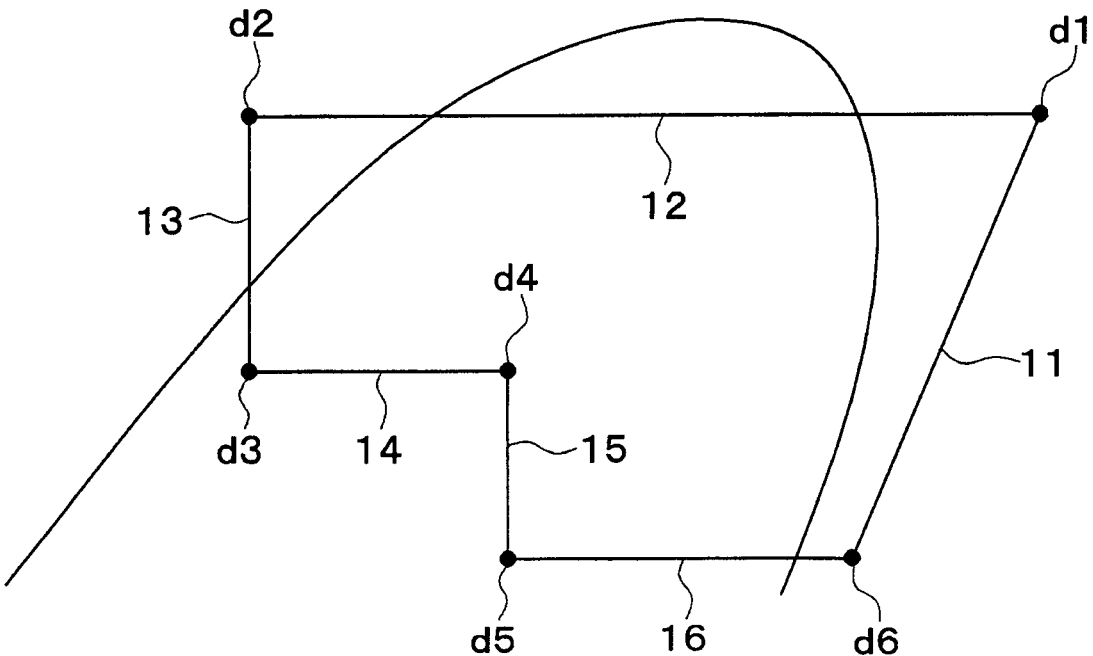
FIG. 7 is a Mollier chart showing the state of a refrigerant in a second dehumidification-heating mode of the refrigeration cycle device in the first embodiment.

That is, as indicated by d1 point and d2 point in FIG. 7, the high-pressure refrigerant discharged from the compressor 11 flows into the high-pressure side heat exchanger 12 and exchanges heat with the coolant in the high-temperature coolant circuit 21 to dissipate the heat therefrom. Thus, the coolant in the high-temperature coolant circuit 21 is heated.

As indicated by the d2 point and d3 point in FIG. 7, the refrigerant flowing out of the high-pressure side heat exchanger 12 flows into the first expansion valve 13 to be decompressed into an intermediate-pressure refrigerant, which has a temperature lower than the outside air temperature. Then, as indicated by the d3 point and d4 point in FIG. 7, the intermediate-pressure refrigerant decompressed in the first expansion valve 13 flows into the exterior heat exchanger 14 and absorbs heat from the outside air blown from the exterior blower.

As indicated by the d4 point and d5 point in FIG. 7, the refrigerant flowing out of the exterior heat exchanger 14 flows into the second expansion valve 15 via a third refrigerant passage 18 to be decompressed and expanded into a low-pressure refrigerant in the second expansion valve 15. Then, as indicated by the d5 point and d6 point in FIG. 7, the low-pressure refrigerant decompressed in the second expansion valve 15 flows into the low-pressure side heat exchanger 16 and absorbs heat from the ventilation air in the vehicle interior blown from the blower 32 to evaporate itself. Thus, the ventilation air in the vehicle interior is cooled by the cooler core 26. Subsequently, as indicated by the d6 point and the d1 point in FIG. 7, the refrigerant flowing out of the low-pressure side heat exchanger 16 flows to the suction side of the compressor 11 to be compressed again in the compressor 11.

As mentioned above, in the second dehumidification-heating mode, like the first dehumidification-heating mode, the ventilation air in the vehicle interior, cooled and dehumidified by the cooler core 26, can be heated by the heater core 24 and blown into the vehicle interior. Thus, the dehumidification-heating of the vehicle interior can be achieved.

Since in the second dehumidification-heating mode, the throttle opening degree of the first expansion valve 13 is decreased to cause the exterior heat exchanger 14 to serve as a heat absorber (i.e., evaporator) at this time, the temperature of the air blown from the heater core 24 can be increased, as compared to in the first dehumidification-heating mode.

As a result, as compared to in the first dehumidification-heating mode, the density of suction refrigerant drawn into the compressor 11 can be increased, and the amount of heat dissipated from the refrigerant in the high-pressure side heat exchanger 12 can be increased without increasing the rotational speed of the compressor 11 (i.e., refrigerant discharge capacity). Thus, the air blowing temperature from the heater core 24 can be raised, as compared to in the first dehumidification-heating mode.

In the high-pressure side heat exchanger 12, the modulator 12b separates the refrigerant condensed by the heat exchanging portion 12a, into gas and liquid phase refrigerants, and stores excess refrigerant therein. The liquid-phase refrigerant flowing out of the modulator 12b flows through the subcooling portion 12c to be subcooled.

In the air-heating mode, the controller 30 opens the subcooling bypass on/off valve 19. Thus, the refrigerant flowing out of the modulator 14b of the exterior heat exchanger 14 flows through the subcooling portion 14c and the subcooling bypass flow passage 18, thereby making it possible to reduce the pressure loss of the refrigerant in the subcooling portion 14c.

In the aforesaid vehicle air conditioner 1 of the present embodiment, as mentioned above, the throttle opening degrees of the first expansion valve 13 and the second expansion valve 15 can be changed to execute appropriate air-cooling, air-heating, and dehumidification-heating of the vehicle interior, thereby achieving comfortable air-conditioning of the vehicle interior.

In the present embodiment, the low-pressure side heat exchanger 16 is arranged in series with the exterior heat exchanger 14 in the refrigerant flow, and the heat medium is cooled by exchanging heat between the low-pressure refrigerant decompressed by at least one of the first expansion valve 13 and the second expansion valve 15 and the coolant. The cooler core 26 cools the air by exchanging heat between the coolant cooled by the low-pressure side heat exchanger 16 and the air to be blown into the vehicle interior.

With this configuration, the exterior heat exchanger 14 and the low-pressure side heat exchanger 16 are arranged in series with each other in the refrigerant flow. Thus, the heat exchange performance of the cooler core 26 can be controlled by adjusting the flow rate of the coolant flowing through the cooler core 26, thereby making it possible to suppress the formation of frost at the cooler core 26, even when the pressure and temperature of the refrigerant in the low-pressure side heat exchanger 16 are low.

Consequently, the refrigerant pressure in the exterior heat exchanger 14 can also be lowered, thereby keeping the amount of heat absorption large to achieve a desired blowing temperature.

As the coolant is interposed between the low-pressure side heat exchanger 16 and the cooler core 26, the temperature of the coolant flowing into the cooler core 26 becomes lower than the temperature of air cooled by the cooler core 26, so that the temperature of the refrigerant flowing into the low-pressure side heat exchanger 16 becomes lower than the temperature of the coolant flowing into the cooler core 26.

Accordingly, the temperature of the refrigerant in the low-pressure side heat exchanger 16 can be lower, as compared to in a structure where an interior evaporator directly exchanges heat between the refrigerant and the air as described in the related art of Patent Document 1 described above. As a result, the refrigerant pressure in the low-pressure side heat exchanger 16 can also be lowered.

In the present embodiment, the controller 30 switches between the heat absorption mode and the heat dissipation mode by adjusting the amounts of decompression in the first expansion valve 13 and the second expansion valve 15. The heat absorption mode is an operation mode (i.e., air-heating mode and second dehumidification-heating mode) in which the exterior heat exchanger 14 absorbs heat into the refrigerant. The heat dissipation mode is an operation mode (i.e., air-cooling mode and first dehumidification-heating mode) in which the exterior heat exchanger 14 dissipates heat from the refrigerant. Thus, the refrigeration cycle device that is switchable between the heat absorption mode and the heat dissipation mode can be achieved by a simple configuration.

In the present embodiment, the modulator 12b on the side of the high-pressure side heat exchanger 12 separates the refrigerant heat-exchanged in the high-pressure side heat exchanger 12 into gas and liquid phase refrigerants and stores the refrigerant during the heat absorption mode. The modulator 14b on the side of the exterior heat exchanger 14 separates the refrigerant heat-exchanged by the exterior heat exchanger 14 into gas and liquid phase refrigerants and stores the refrigerant during the heat dissipation mode.

Specifically, the modulator 12b on the side of the high-pressure side heat exchanger 12 is disposed on the refrigerant-flow downstream side of the high-pressure side heat exchanger 12 and on the refrigerant-flow upstream side of the first expansion valve 13. The modulator 12b separates the refrigerant heat-exchanged in the high-pressure side heat exchanger 12 into gas and liquid phase refrigerants and stores the refrigerant. The modulator 14b on the side of the exterior heat exchanger 14 is disposed on the refrigerant-flow downstream side of the exterior heat exchanger 14 and on the refrigerant-flow upstream side of the second expansion valve 15. The modulator 14b separates the refrigerant heat-exchanged in the exterior heat exchanger 14 into gas and liquid phase refrigerants and stores the refrigerant.

Thus, the refrigerant reservoir can be provided on the high-pressure side of the cycle in both the heat absorption mode and the heat dissipation mode. In other words, the refrigeration cycle can serve as a receiver cycle in both the heat absorption mode and the heat dissipation mode.

Thus, the viscosity of each of the refrigerant and refrigerant oil in the refrigerant reservoir is reduced, as compared to an accumulator cycle in which a refrigerant reservoir is provided on the low-pressure side of the cycle, thereby making it possible to reduce the pressure loss of the refrigerant and to easily discharge the refrigerant oil, thus improving the cycle performance. As the refrigerant oil can be easily discharged, the amount of charged refrigerant oil can be lessened, thereby reducing the size of the refrigerant reservoir.

The optimum control can be performed so that the refrigerant reservoir can be automatically moved depending on the heat absorption mode and the heat dissipation mode, and the high-pressure side enthalpy can be reduced to a liquid saturation line in both the heat absorption mode and the heat dissipation mode.

In the present embodiment, the controller 30 controls the operation of the low-temperature side pump 25 to adjust the flow rate of the coolant in at least one of the low-pressure side heat exchanger 16 and the cooler core 26, when the temperature of the coolant flowing out of the low-pressure side heat exchanger 16 is equal to or lower than 0° C. in the heat absorption mode.

For example, the controller 30 controls the operation of the low-temperature side pump 25 to adjust the flow rates of the coolants in both the low-pressure side heat exchanger 16 and the cooler core 26, when the temperature of the coolant flowing out of the low-pressure side heat exchanger 16 is equal to or lower than 0° C. in the heat absorption mode.

Specifically, the controller 30 controls the operation of the low-temperature side pump 25 such that the flow rate of the coolant in at least one of the low-pressure side heat exchanger 16 and the cooler core 26 is decreased as the pressure of the refrigerant in the exterior heat exchanger 14 becomes lower.

With this configuration, the heat exchange performance of the cooler core 26 can be controlled by adjusting the flow rate of the coolant flowing through the cooler core 26, thereby making it possible to suppress the formation of frost at the cooler core 26, even when the pressure and temperature of the refrigerant in the low-pressure side heat exchanger 16 are low.

Consequently, the refrigerant pressure in the exterior heat exchanger 14 can also be reduced, thereby keeping the amount of heat absorption large to achieve a desired blowing temperature.

The temperature difference between the refrigerant and the coolant can be increased by adjusting the flow rate of the refrigerant flowing through the low-pressure side heat exchanger 16. The temperature difference between the air and the coolant can be increased by adjusting the flow rate of the coolant flowing through the cooler core 26.

As a result, the temperature difference between the air and coolant can be increased. Even when the refrigerant temperature (i.e., the refrigerant pressure) in the exterior heat exchanger 14 is decreased in order to gain a large amount of heat absorption in the exterior heat exchanger 14, the coolant flowing into the cooler core 26 can be suppressed from being at a temperature of 0° C. or lower, thus preventing the formation of frost at the cooler core 26.

The controller 30 may adjust the flow rate of the coolant by controlling the rotational speed of the low-temperature side pump 25. The controller 30 may adjust the flow rate (i.e., average time flow rate) of the coolant by intermittently driving the low-temperature side pump 25.

A flow-rate adjustment valve may be disposed in the low-temperature coolant circuit 22. Thus, the controller 30 can adjust the flow rate of the coolant by adjusting the opening degree of the flow-rate adjustment valve.

In the present embodiment, the subcooling bypass on/off valve 19 reduces a flow-passage opening degree of the subcooling bypass flow passage 18 in the heat dissipation mode, as compared with in the heat absorption mode.

Thus, in the heat dissipation mode, the amount of the coolant flowing through the subcooling bypass flow passage 18 becomes smaller, and the amount of the coolant flowing through the subcooling portion 14c on the side of the exterior heat exchanger 14 becomes larger than in the heat absorption mode. Therefore, in the heat dissipation mode that requires the subcooling bypass flow passage 18 to subcool the refrigerant, the refrigerant can be surely subcooled in the subcooling bypass flow passage 18.

In the heat absorption mode, the amount of the coolant flowing through the subcooling bypass flow passage 18 becomes larger, and the amount of the coolant flowing through the subcooling portion 14c on the side of the exterior heat exchanger 14 becomes smaller. Thus, an increase in pressure loss at the subcooling portion 14c on the side of the exterior heat exchanger 14 can be suppressed in the heat absorption mode that does not require the subcooling bypass flow passage 18 to subcool the refrigerant.

In the present embodiment, the subcooling bypass flow passage 18 extends from the subcooling-portion distribution tank 14h of the exterior heat exchanger 14 to the refrigerant-flow downstream side of the subcooling portion 14c on the side of the exterior heat exchanger 14.

Thus, in both the heat absorption mode and the heat dissipation mode, the refrigerant having passed through the modulator 14b on the side of the exterior heat exchanger 14 flows into the subcooling bypass flow passage 18. Thus, a conventional modulator can be used as the modulator 14b on the side of the exterior heat exchanger 14 without changing its design. For example, the position of the filter 14m inside the modulator 14b does not need to be changed with respect to the conventional modulator.

As mentioned above, in the air-cooling mode, the coolant does not circulate through the high-pressure side heat exchanger 12 because the high-temperature side pump 23 is stopped. At this time, if the temperature of the refrigerant flowing through the high-pressure side heat exchanger 12 becomes high to increase the temperature of the coolant in the high-pressure side heat exchanger 12, the coolant might boil inside the high-pressure side heat exchanger 12.

For this reason, in the present embodiment, the controller 30 stops the high-temperature side pump 23 in the air-cooling mode. The controller 30 controls the operation of the high-temperature side pump 23 to increase the flow rate of the high-temperature side coolant flowing through the high-pressure side heat exchanger 12 when the temperature of the high-temperature side coolant in the high-pressure side heat exchanger 12 becomes equal to or higher than a predetermined temperature in the air-cooling mode. Thus, the coolant can be prevented from boiling within the high-pressure side heat exchanger 12 in the air-cooling mode.

In the present embodiment, the controller 30 also controls the operation of the low-temperature side pump 25 to adjust the flow rate of the coolant in the low-pressure side heat exchanger 16, thus controlling the superheat degree of the refrigerant which is heat-exchanged in the low-pressure side heat exchanger 16. Thus, the superheat degree can be controlled very easily.

When the coolant does not circulate between the low-pressure side heat exchanger 16 and the cooler core 26 while the coolant pump 25 stops, the temperature of the coolant in the cooler core 26 becomes higher than the temperature of the coolant within the low-pressure side heat exchanger 16 if the blower 27 operates to blow the air toward the cooler core 26. Then, when the coolant moves due to convection caused by such a temperature difference of the coolant, the low-temperature coolant in the low-pressure side heat exchanger 16 could be interchanged with the high-temperature coolant in the cooler core 26. In such a case, frost could be formed at the cooler core 26, or the amount of heat absorption in the refrigerant at the low-pressure side heat exchanger 16 could be lessened.

For this reason, in the present embodiment, the heat exchanging portion 26c of the cooler core 26 is disposed at a higher position in the gravity direction than the coolant inlet 16a and the coolant outlet 16b of the low-pressure side heat exchanger 16. Thus, the present embodiment can suppress the interchange between the low-temperature coolant in the low-pressure side heat exchanger 16 and the high-temperature coolant in the cooler core 26 due to convection, and also can prevent the formation of frost at the cooler core 26 or the reduction in the amount of heat absorption into the refrigerant in the low-pressure side heat exchanger 16.

For the same reason, the present embodiment can also prevent the formation of frost at the cooler core 26 or the reduction in the amount of heat absorption of the refrigerant in the low-pressure side heat exchanger 16, even when at least a part of the low-temperature coolant flow passage 22a formed in the low-temperature coolant circuit 22 is disposed at a lower position in the gravity direction than the heat exchanging portion 26c of the cooler core 26.

Second Embodiment

Figure 8:
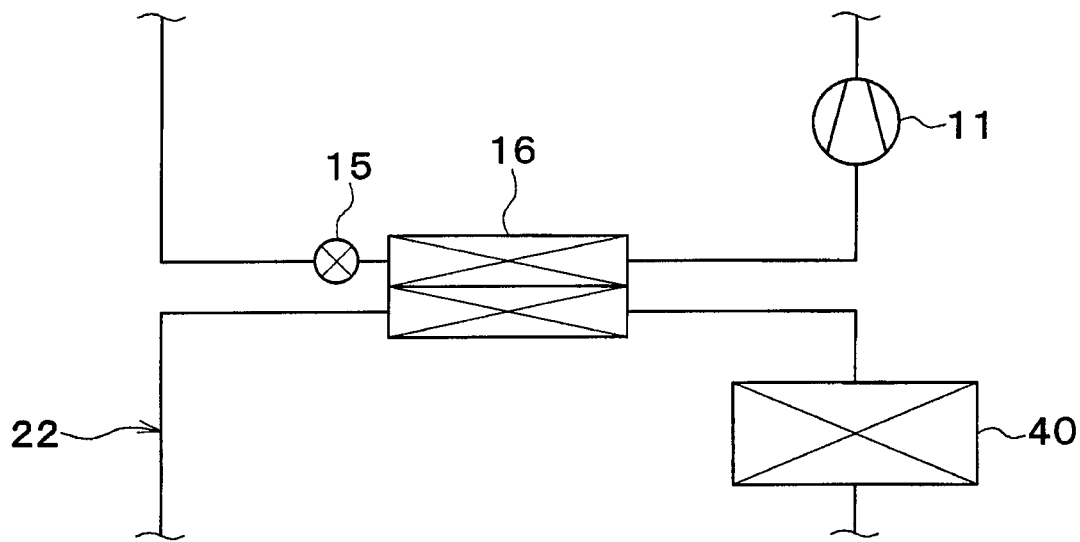
FIG. 8 is a configuration diagram showing a part of a refrigeration cycle device in a first example of a second embodiment.
Figure 9:
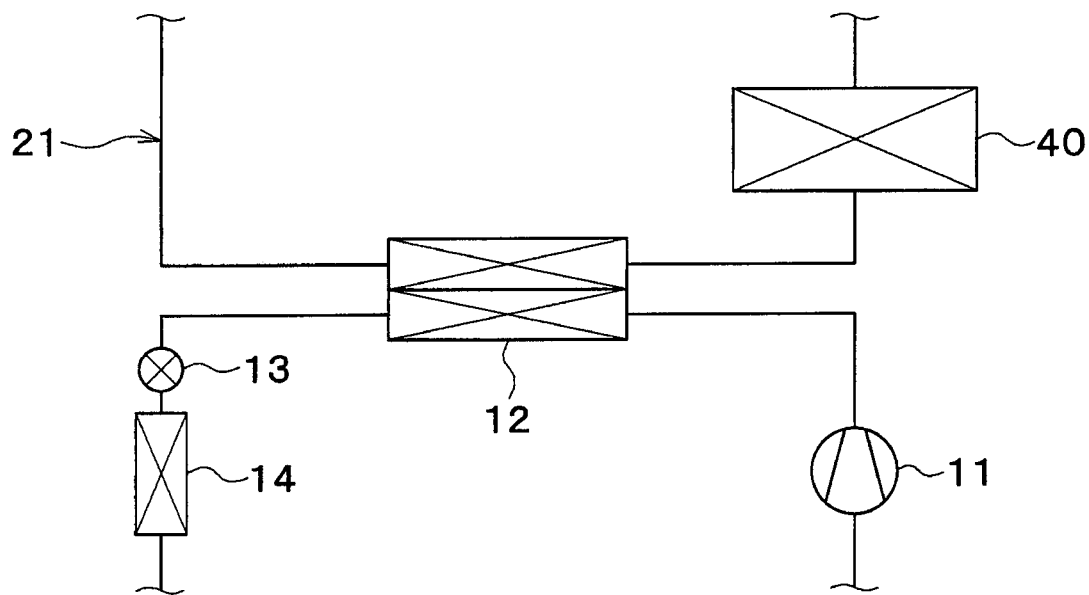
FIG. 9 is a configuration diagram showing a part of a refrigeration cycle device in a second example of the second embodiment.

As shown in FIGS. 8 and 9, a refrigeration cycle device 10 in the present embodiment includes a heat supply device 40. The heat supply device 40 is a device that supplies heat to the coolant. In the heat supply device 40, the coolant circulates. Examples of the heat supply device 40 include a heat generating device, a ventilation heat recovery heat exchanger, and the like.

Examples of the heat generating device include an engine, a travelling electric motor, a battery, an inverter, a DC-DC converter, a turbocharger, an intercooler, an EGR cooler, a CVT cooler, and the like.

The ventilation heat recovery heat exchanger is a heat exchanger that recovers heat exhausted by ventilation. The ventilation heat recovery heat exchanger is the heat exchanger that exchanges heat between the coolant and air discharged from the vehicle interior to the outside of the vehicle cabin for ventilation.

In a first example shown in FIG. 8, the heat supply device 40 is disposed in the low-temperature coolant circuit 22. In a second example shown in FIG. 9, the heat supply device 40 is disposed in the high-temperature coolant circuit 21.

Figure 10:
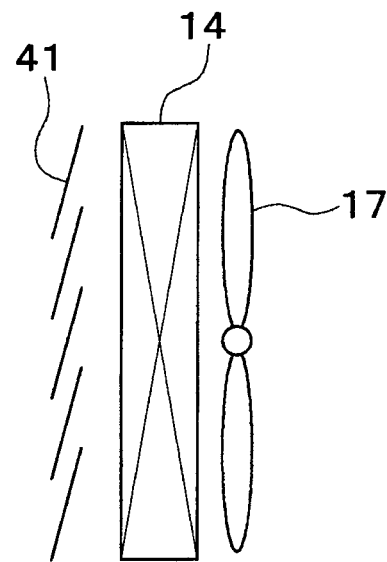
FIG. 10 is a schematic diagram showing an exterior heat exchanger and a shutter in the second embodiment.

As shown in FIG. 10, a shutter 41 is disposed in the vicinity of the exterior heat exchanger 14. The shutter 41 is driven to open and close by an electric actuator (not shown). The operation of the electric actuator is controlled by the controller 30.

The shutter 41 adjusts the opening degree of the passage for the outside air flowing through the exterior heat exchanger 14. That is, the shutter 41 is a heat-exchanger flow-rate adjustment portion that adjusts the flow rate of outside air flowing through the exterior heat exchanger 14. For example, by decreasing the opening degree of the shutter 41, the flow rate of the outside air flowing through the exterior heat exchanger 14 can be decreased.

Figure 11:
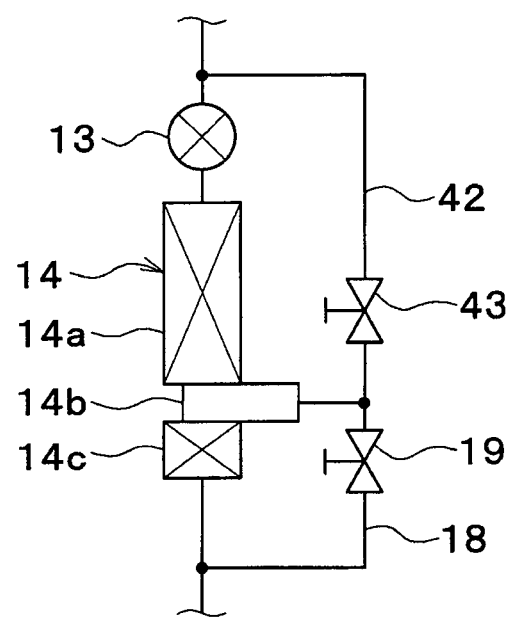
FIG. 11 is a configuration diagram showing a part of the refrigeration cycle device in the second embodiment.

As shown in FIG. 11, the refrigeration cycle device 10 in the present embodiment includes a heat-exchanger bypass flow passage 42 and a heat-exchanger bypass on/off valve 43. The heat-exchanger bypass flow passage 42 is a heat-exchanger bypass portion that causes the refrigerant to flow while bypassing the first expansion valve 13 and the exterior heat exchanger 14. In the example of FIG. 11, the heat-exchanger bypass flow passage 42 merges with the subcooling bypass flow passage 18.

The heat-exchanger bypass on/off valve 43 is a heat-exchanger bypass opening-degree adjustment portion that adjusts an opening degree of the heat-exchanger bypass flow passage 42. That is, the heat-exchanger bypass on/off valve 43 is a heat-exchanger flow-rate adjustment portion that adjusts the flow rate of the outside air flowing through the exterior heat exchanger 14. The heat-exchanger bypass on/off valve 43 is an electromagnetic valve and controlled by the controller 30. For example, by increasing the opening degree of the heat-exchanger bypass on/off valve 43, the flow rate of the refrigerant flowing into the exterior heat exchanger 14 can be decreased.

In the present embodiment, the heat supply device 40 supplies heat to the coolant, thereby making it possible to improve the cycle performance. In particular, in the air-heating mode, the heat supplied from the heat supply device 40 is introduced to the low-pressure side heat exchanger 16, so that the formation of frost at the exterior heat exchanger 14 can be suppressed, and the air heating performance can be improved.

When the amount of heat introduced from the heat supply device 40 to the low-pressure side heat exchanger 16 is extremely large in the air-heating mode, the temperature of the refrigerant flowing into the exterior heat exchanger 14 becomes extremely high, thus increasing the low-pressure side refrigerant pressure in the refrigeration cycle. Consequently, the temperature of the refrigerant flowing into the exterior heat exchanger 14 might become equal to or higher than the outside air temperature, leading to the waste of heat due to heat dissipation from the refrigerant in the exterior heat exchanger 14.

For this reason, in the present embodiment, the controller 30 controls the operation of at least one of the exterior blower 17, the shutter 41, and the heat-exchanger bypass on/off valve 43 so as to decrease a flow rate of at least one of the outside air and the refrigerant, flowing into the exterior heat exchanger 14, when a temperature difference between the outside air and the refrigerant, flowing into the exterior heat exchanger 14, is equal to or less than a predetermined value. Thus, the refrigerant can be suppressed from dissipating heat in the exterior heat exchanger 14.

For example, when the temperature difference between the outside air and the refrigerant flowing into the exterior heat exchanger 14 is equal to or less than a predetermined value, the controller 30 may reduce the rotational speed of the exterior heat exchanger 14 to reduce the flow rate of the outside air flowing into the exterior heat exchanger 14.

For example, when the temperature difference between the outside air and the refrigerant flowing into the exterior heat exchanger 14 is equal to or less than the predetermined value, the controller 30 may control the operation of the exterior blower 17 to invert the blowing direction of the outside air toward the exterior heat exchanger 14.

The blowing direction of the outside air to the exterior heat exchanger 14 is inverted, so that the high-temperature outside air in the engine room of the vehicle (i.e., outside air heated by the engine) can be caused to flow into the exterior heat exchanger 14. Thus, the heat of the refrigerant can be surely prevented from being wastefully dissipated in the exterior heat exchanger 14.

For example, when the temperature difference between the refrigerant flowing into the exterior heat exchanger 14 and the outside air is equal to or less than a predetermined value, the controller 30 may control the operation of the shutter 41 to decrease an opening degree of the passage for the outside air flowing through the exterior heat exchanger 14, thereby reducing the flow rate of the outside air flowing into the exterior heat exchanger 14.

For example, when the temperature difference between the outside air and the refrigerant flowing into the exterior heat exchanger 14 is equal to or less than the predetermined value, the controller 30 may increase an opening degree of the heat-exchanger bypass on/off valve 43, thereby reducing the flow rate of the refrigerant flowing into the exterior heat exchanger 14.

Third Embodiment

Figure 12:
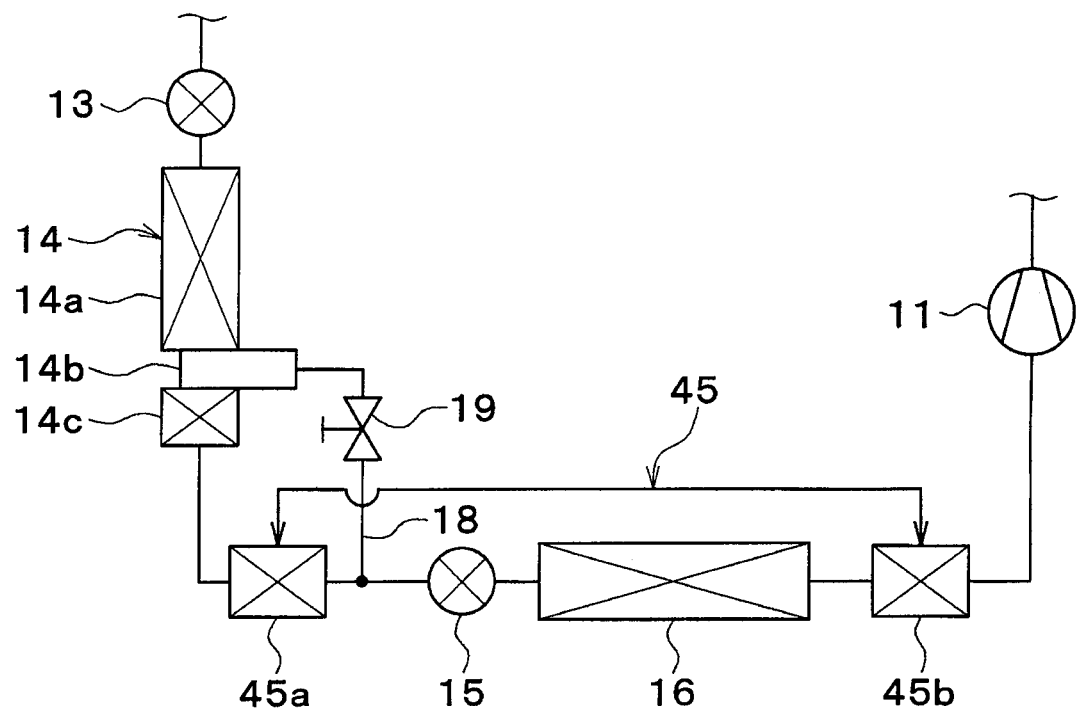
FIG. 12 is a configuration diagram showing a part of a refrigeration cycle device in a third embodiment.

As shown in FIG. 12, a refrigeration cycle device 10 may include an internal heat exchanger 45. The internal heat exchanger 45 has a high-pressure side refrigerant passage 45a and a low-pressure side refrigerant passage 45b.

The internal heat exchanger 45 is a heat exchanger that exchanges heat between the high-pressure side refrigerant circulating through the high-pressure side refrigerant passage 45a and the low-pressure side refrigerant circulating through the low-pressure side refrigerant passage 45b.

The high-pressure side refrigerant passage 45a is disposed on the refrigerant-flow downstream side of the exterior heat exchanger 14 and on the refrigerant-flow upstream side of the second expansion valve 15. The low-pressure side refrigerant passage 45b is disposed on the refrigerant-flow downstream side of the low-pressure side heat exchanger 16 and on the refrigerant suction side of the compressor 11.

Fourth Embodiment

Figure 13:
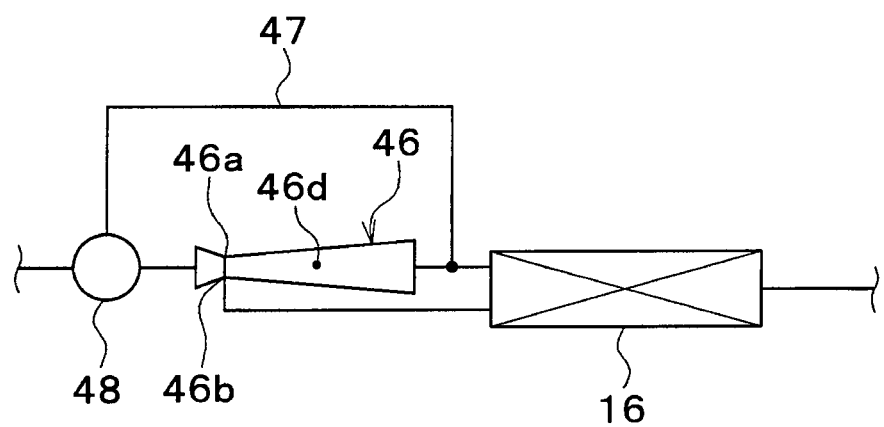
FIG. 13 is a configuration diagram showing a part of a refrigeration cycle device in a fourth embodiment.

In the present embodiment, as shown in FIG. 13, an ejector 46 is disposed instead of the second expansion valve 15.

The ejector 46 serves as a decompression portion that decompresses the refrigerant, and also serves as a fluid-transportation refrigerant circulating portion (i.e., momentum transportation pump) that causes the refrigerant to circulate by a suction action (i.e., a winding action) of the refrigerant flow jetted at high speed.

The ejector 46 includes a nozzle portion 46a and a refrigerant suction port 46b. The nozzle portion 46a narrows its passage area for the refrigerant having passed through the exterior heat exchanger 14 to decompress and expand the refrigerant. The refrigerant suction port 46b is disposed in the same space as a refrigerant jet port of the nozzle portion 46a, and draws the gas-phase refrigerant from the low-pressure side heat exchanger 16.

A diffuser portion 46d is disposed in a part of the ejector 46 located on the refrigerant-flow downstream side of the nozzle portion 46a and the refrigerant suction port 46b. The diffuser portion 46d is a booster portion that mixes and pressurizes the high-speed refrigerant flow from the nozzle portion 46a and the suction refrigerant in the refrigerant suction port 46b.

The diffuser portion 46d is formed in a shape that gradually increases the passage area for the refrigerant, and serves to decelerate the refrigerant flow and raise the refrigerant pressure, that is, to convert speed energy of the refrigerant into pressure energy thereof.

The low-pressure side heat exchanger 16 is connected to the side of an outlet portion of the ejector 46 (tip end of the diffuser portion 46d).

One end of an ejector bypass flow passage 47 is connected to the refrigerant inlet side of the nozzle portion 46a via a three-way valve 48. The ejector bypass flow passage 47 is a flow passage through which the refrigerant flows while bypassing the ejector 46. The other end of the ejector bypass flow passage 47 is connected to the refrigerant inlet side of the low-pressure side heat exchanger 16. The three-way valve 48 switches between a state in which the refrigerant flows out to the side of the ejector 46 and a state in which the refrigerant flows out to the side of the ejector bypass flow passage 47. The operation of the three-way valve 48 is controlled by the controller 30.

Fifth Embodiment

Figure 14:
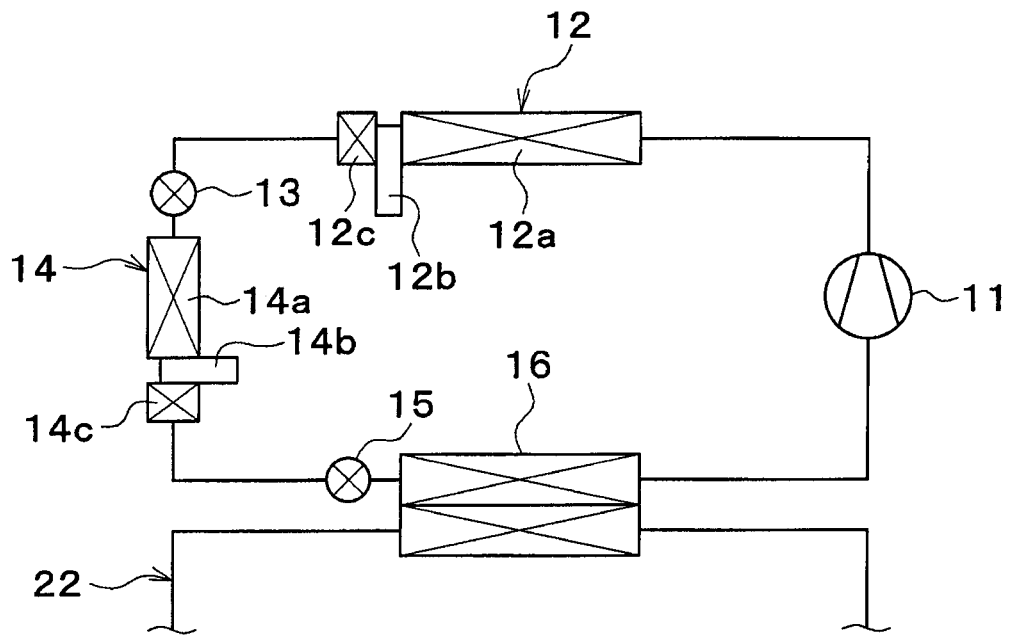
FIG. 14 is a configuration diagram showing a part of a refrigeration cycle device in a first example of a fifth embodiment.
Figure 15:
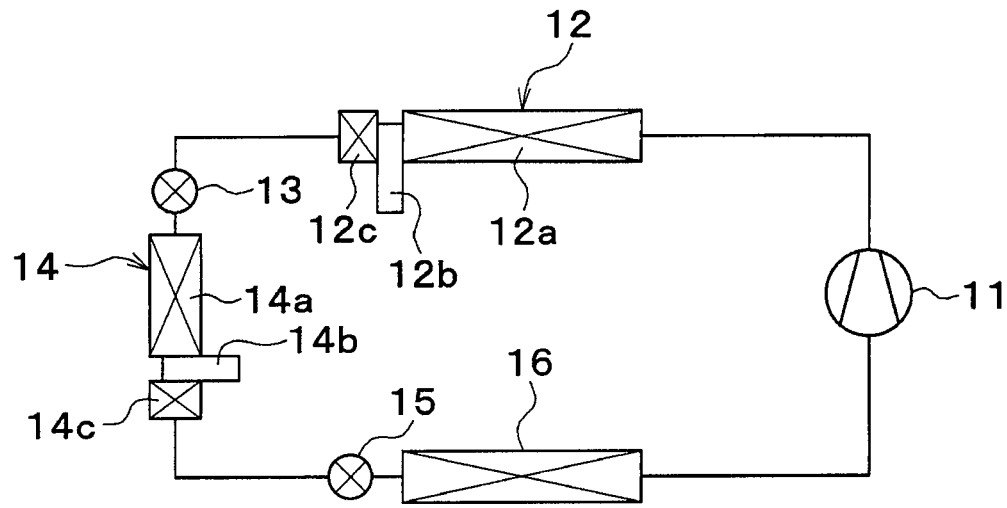
FIG. 15 is a configuration diagram showing a part of a refrigeration cycle device in a second example of the fifth embodiment.

In the above-mentioned embodiments, the high-pressure side heat exchanger 12 exchanges heat between the high-pressure side refrigerant discharged from the compressor 11 and the coolant in the high-temperature coolant circuit 21. Meanwhile, in a first example of the present embodiment shown in FIG. 14 and a second example of the present embodiment shown in FIG. 15, the high-pressure side heat exchanger 12 may exchange heat between the high-pressure side refrigerant discharged from the compressor 11 and the air to be blown into the vehicle interior. The high-pressure side heat exchanger 12 shown in FIG. 14 or 15 is accommodated in an air-conditioning casing (not shown), instead of the heater core 24 of the above-mentioned embodiments.

Figure 16:
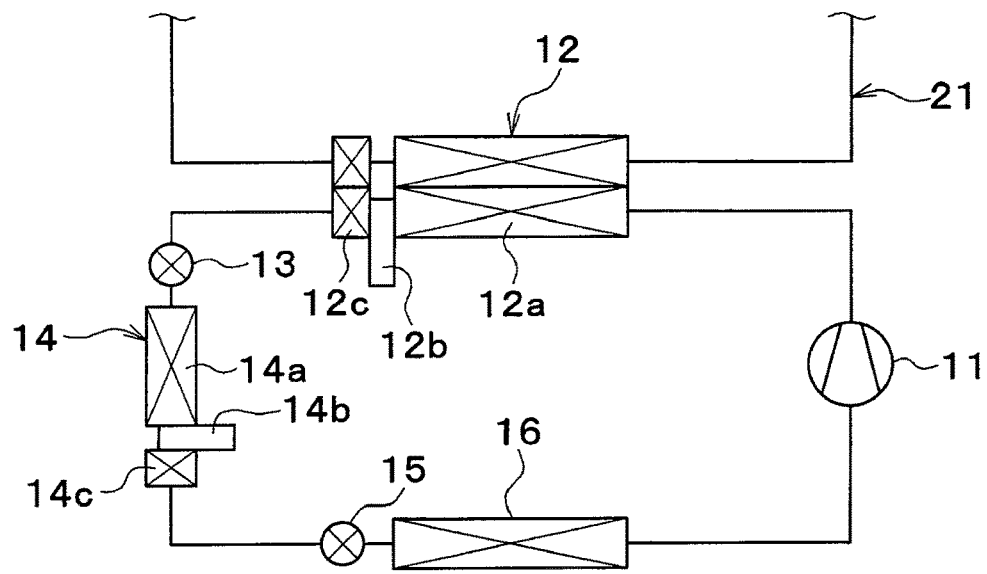
FIG. 16 is a configuration diagram showing a part of a refrigeration cycle device in a third example of the fifth embodiment.

In the above-mentioned embodiments, the low-pressure side heat exchanger 16 exchanges heat between the low-pressure refrigerant flowing out of the second expansion valve 15 and the coolant in the low-temperature coolant circuit 22. Meanwhile, in the second example of the present embodiment shown in FIG. 15 and a third example of the present embodiment shown in FIG. 16, the low-pressure side heat exchanger 16 may exchange heat between the low-pressure refrigerant flowing out of the second expansion valve 15 and the air to be blown into the vehicle interior. The low-pressure side heat exchanger 16 shown in FIG. 15 or 16 is accommodated in an air-conditioning casing (not shown), instead of the cooler core 26 of the above-mentioned embodiments.

Sixth Embodiment

The refrigeration cycle device 10 of the above-mentioned embodiment configures a receiver cycle that includes modulators 12b and 14b on the high-pressure side. In a first example of the present embodiment shown in FIG. 17 and a second example of the present embodiment shown in FIG. 18, the refrigeration cycle device 10 may configure an accumulator cycle that includes an accumulator 50 on the low-pressure side.

The accumulator 50 is a refrigerant reservoir that separates the refrigerant flowing out of the low-pressure side heat exchanger 16 into gas and liquid phases, stores the separated liquid-phase refrigerant therein, and causes the separated gas-phase refrigerant to flow out to the suction port side of the compressor 11.

Figure 17:
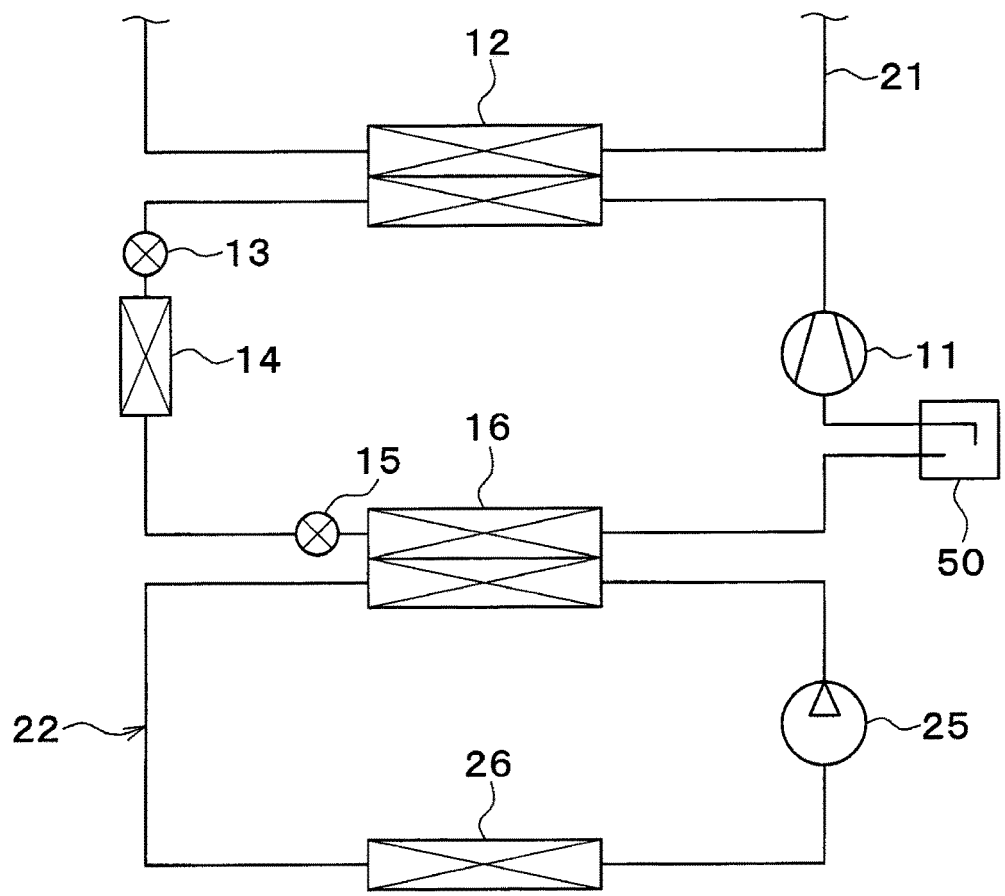
FIG. 17 is a configuration diagram showing a part of a refrigeration cycle device in a first example of a sixth embodiment.
Figure 18:
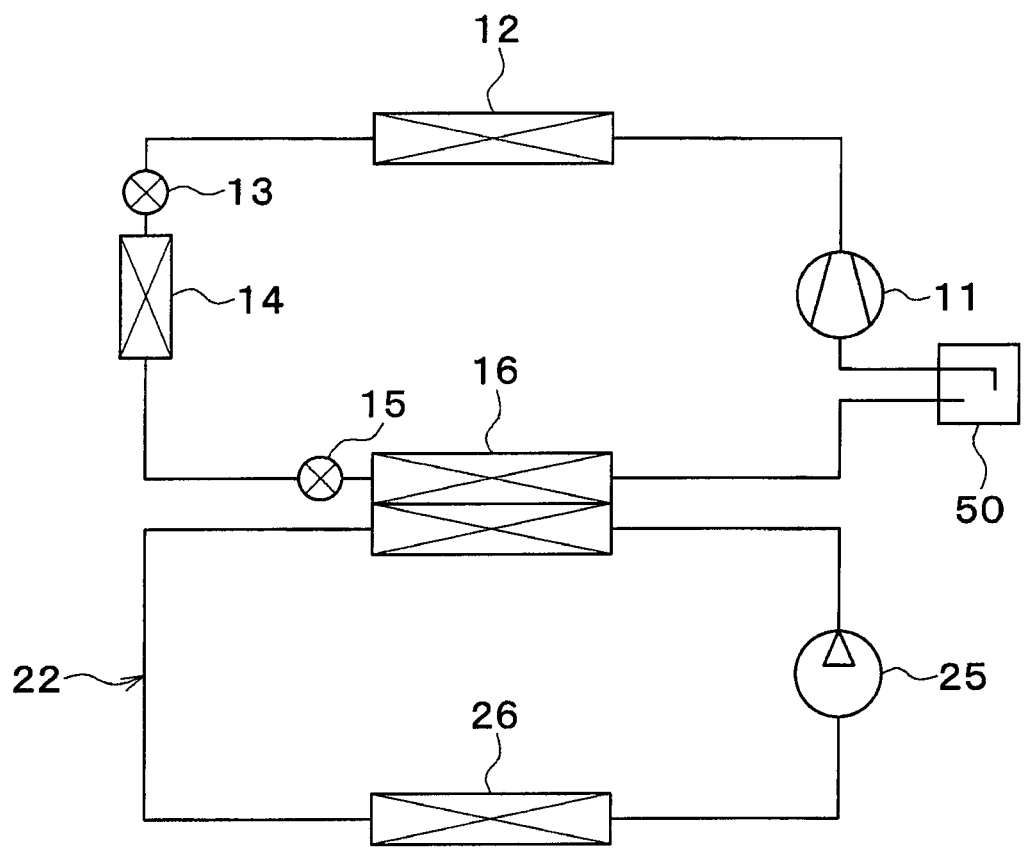
FIG. 18 is a configuration diagram showing a part of a refrigeration cycle device in a second example of the sixth embodiment.

The high-pressure side heat exchanger 12 shown in FIG. 17 exchanges heat between the high-pressure side refrigerant discharged from the compressor 11 and the coolant in a high-temperature coolant circuit 21. The high-pressure side heat exchanger 12 shown in FIG. 18 exchanges heat between the high-pressure side refrigerant discharged from the compressor 11 and the air to be blown into the vehicle interior.

Seventh Embodiment

Figure 19:
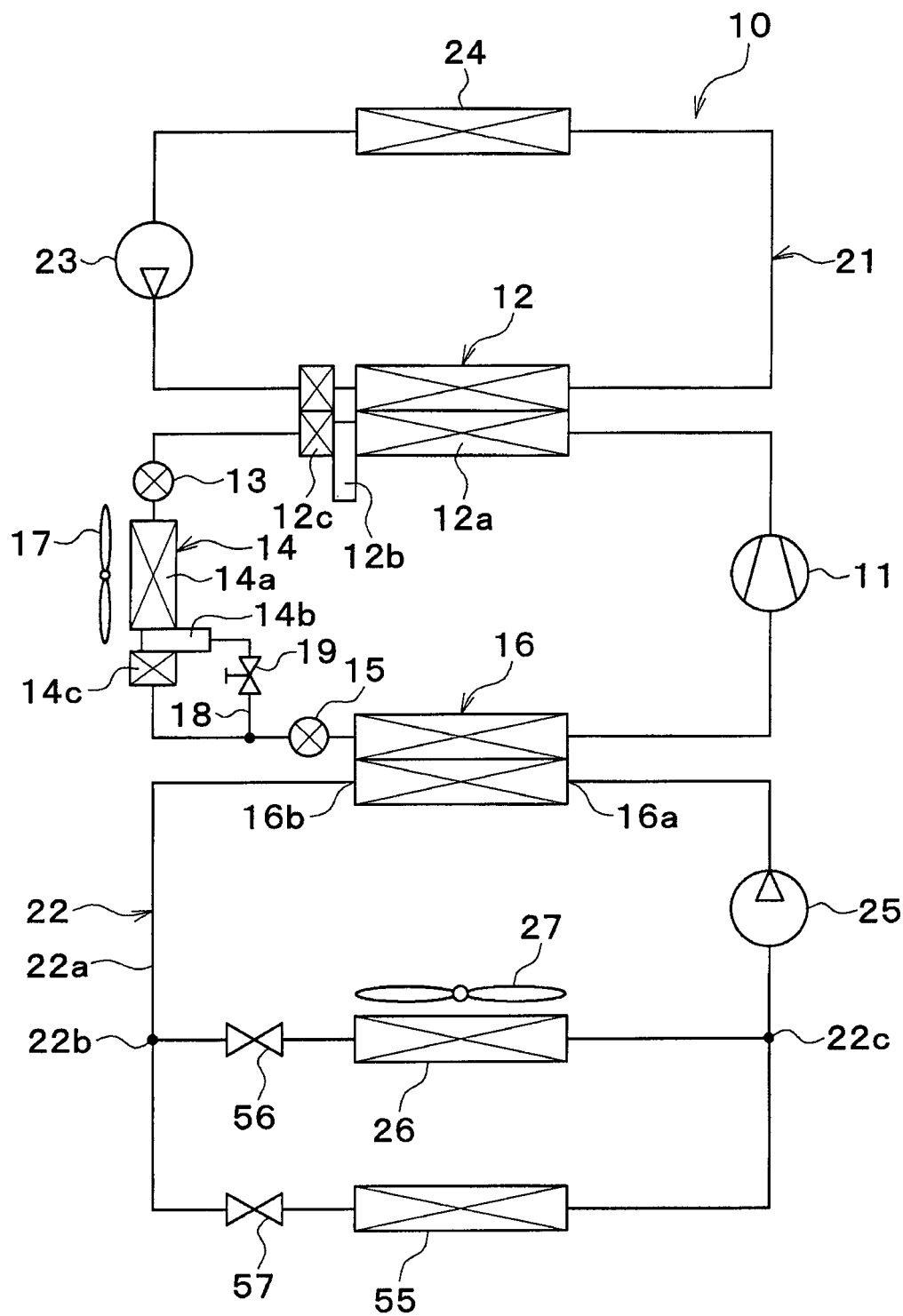
FIG. 19 is an entire configuration diagram of a refrigeration cycle device in a seventh embodiment.

In the present embodiment, as shown in FIG. 19, a vehicle-mounted device 55 is disposed in the low-temperature coolant circuit 22. The vehicle-mounted device 55 is disposed in parallel with the cooler core 26 with respect to the flow of the coolant in the low-temperature coolant circuit 22.

The vehicle-mounted device 55 is a device that is mounted on a vehicle and generates heat during its operation. Examples of the vehicle-mounted device 55 include a battery heat exchanger, an inverter, a transaxle, a motor generator, and the like.

The battery and the transaxle have their performance deteriorated when being subcooled, and thus need the adjustment of their temperatures to some extent.

A vehicle-mounted device temperature sensor (not shown) is connected to the input side of the controller 30. The vehicle-mounted device temperature sensor is a vehicle-mounted temperature detector that detects the temperature of the vehicle-mounted device 55. The vehicle-mounted device temperature sensor may be a sensor that detects the temperature of the coolant flowing into the vehicle-mounted device 55.

The low-temperature coolant circuit 22 includes a branch portion 22b and a merging portion 22c. In the branch portion 22b, the flow of the coolant flowing out of the low-pressure side heat exchanger 16 is branched into the flow of a coolant on the side of the cooler core 26 and the flow of a coolant on the side of the vehicle-mounted device 55. In the merging portion 22c, the flow of the coolant flowing out of the cooler core 26 is merged with the flow of the coolant flowing out of the vehicle-mounted device 55.

A first flow adjustment valve 56 is disposed between the branch portion 22b and the cooler core 26 in the low-temperature coolant circuit 22. A second flow adjustment valve 57 is disposed between the branch portion 22b and the vehicle-mounted device 55 in the low-temperature coolant circuit 22.

The first flow adjustment valve 56 and the second flow adjustment valve 57 are valves that adjust the flow rate of the coolant by changing an opening degree of the corresponding coolant flow passage. The first flow adjustment valve 56 and the second flow adjustment valve 57 are also valves capable of fully opening and completely closing their coolant flow passages. The first flow adjustment valve 56 and the second flow adjustment valve 57 are electromagnetic valves controlled by the controller 30.

The first flow adjustment valve 56 and the second flow adjustment valve 57 are flow-rate adjustment portions that adjust the flow rate of the coolant flowing to the cooler core 26 and the flow rate of the coolant flowing to the vehicle-mounted device 55, respectively.

In the present embodiment, the controller 30 controls the first flow adjustment valve 56 and the second flow adjustment valve 57 such that the temperature adjustment of the cooler core 26 is prioritized over the temperature adjustment of the vehicle-mounted device 55.

As mentioned in the above embodiments, in the first dehumidification-heating mode and the second dehumidification-heating mode, the coolant cooled by the low-pressure side heat exchanger 16 flows into the cooler core 26, and the air to be blown into the vehicle interior is cooled by the cooler core 26, thereby performing dehumidification. Furthermore, the coolant heated by the high-pressure side heat exchanger 12 flows into the heater core 24, and the air cooled by the cooler core 26 is heated by the heater core 24, thereby producing the conditioned air having a target air outlet temperature.

At this time, a target air outlet temperature of the heater core 24 (i.e., a target air outlet temperature TAO) differs depending on the inside air temperature, the outside air temperature, and the like.

Figure 20:
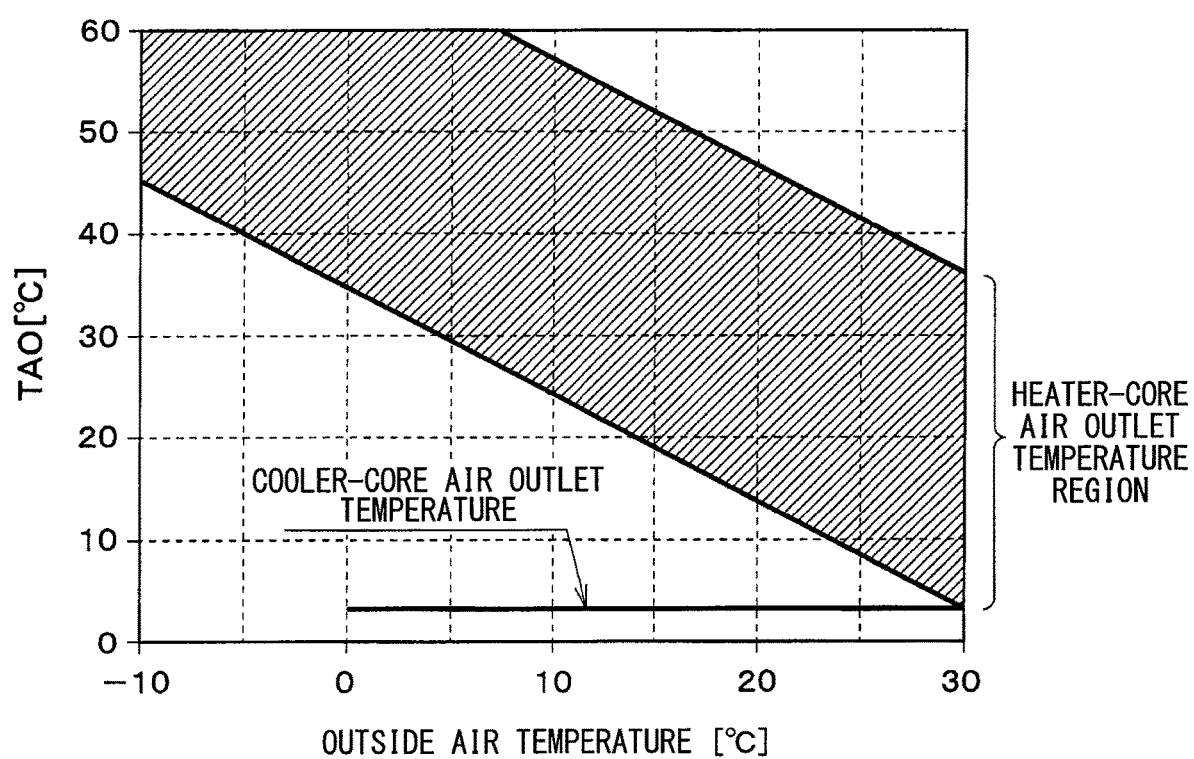
FIG. 20 is a graph exemplifying the relationship between the outside air temperature and each of the target air outlet temperature of a heater core and the target air outlet temperature of the cooler core in the seventh embodiment.

FIG. 20 is a graph exemplifying the relationship between the outside air temperature and each of the target air outlet temperature of the heater core 24 and the target air outlet temperature of the cooler core 26.

At a low outside air temperature (for example, 0° C. to 10° C.), by switching to the above-mentioned second dehumidification-heating mode, heat is absorbed in the exterior heat exchanger 14, the cooler core 26, and the vehicle-mounted device 55 to generate a desired heater-core air outlet temperature.

At this time, the controller 30 performs cooler core frost prevention control (in other words, frost suppression control). The cooler core frost prevention control is the control to adjust the flow rate of the coolant flowing through the cooler core 26 by using the first flow adjustment valve 56 in order to prevent the formation of frost at the cooler core 26.

Specifically, the controller 30 decreases or completely closes the opening degree of the first flow adjustment valve 56 to thereby reduce or set the flow rate of the coolant flowing through the cooler core 26 to zero (0), when the surface temperature of the cooler core 26 or the temperature of the coolant flowing into the cooler core 26 is determined to be equal to or lower than the frost limit temperature (for example, 0° C.), or when the surface temperature of the cooler core 26 or the temperature of the coolant flowing into the cooler core 26 is anticipated to be equal to or lower than the frost limit temperature (for example, 0° C.). In this way, the surface temperature of the cooler core 26 is raised, thereby making it possible to suppress the formation of frost at the cooler core 26.

At this time, the amount of heat absorption in the cooler core 26 is decreased, but heat is absorbed from the vehicle-mounted device 55, so that the heat for air heating can be obtained. Thus, the heat required for air heating can be ensured without increasing the rotational speed of the compressor 11 to the extent possible.

The controller 30 adjusts the flow rate of the coolant flowing through the vehicle-mounted device 55 by using the second flow adjustment valve 57 to prevent the vehicle-mounted device 55 from being subcooled.

Specifically, the controller 30 decreases or completely closes the opening degree of the second flow adjustment valve 57 to thereby reduce or set the flow rate of the coolant flowing through the vehicle-mounted device 55 to zero (0), when the temperature of the vehicle-mounted device 55 or the temperature of the coolant flowing into the vehicle-mounted device 55 is determined to be equal to or lower than its lower limit temperature, or when the temperature of the vehicle-mounted device 55 or the temperature of the coolant flowing into the vehicle-mounted device 55 is anticipated to be equal to or lower than the lower limit temperature. Thus, the temperature of the vehicle-mounted device 55 is raised, thereby making it possible to suppress the vehicle-mounted device 55 from being subcooled.

The controller 30 decreases or sets the flow rate of the coolant discharged from the low-temperature side pump 25 to zero (0) when the opening degrees of both the first flow adjustment valve 56 and the second flow adjustment valve 57 are decreased or completely closed.

The low-temperature side pump 25 is a flow-rate adjustment portion that adjusts the flow rate of the coolant flowing to the cooler core 26 and the flow rate of the coolant flowing to the vehicle-mounted device 55.

In the present embodiment, the controller 30 controls the first flow adjustment valve 56 to perform the frost suppression control. When the frost suppression control is performed, the controller 30 also controls the second flow adjustment valve 57 to cause the coolant to flow to the vehicle-mounted device 55. The frost suppression control is the control for preventing the formation of frost at the cooler core 26 by controlling the first flow adjustment valve 56 and the low-temperature side pump 25 to reduce the flow rate of the coolant flowing through the cooler core 26.

Thus, the frost suppression control can be performed to suppress the formation of frost at the cooler core 26. When the frost suppression control is performed, the coolant is caused to flow through the vehicle-mounted device 55 to thereby absorb heat from the vehicle-mounted device 55. Thus, even when the amount of heat absorption from the cooler core 26 is decreased by performing the frost suppression control, the amount of heat absorbed from the vehicle-mounted device 55 can compensate for the decrease, thus ensuring the air blowing temperature to the vehicle interior.

Therefore, the present embodiment can achieve both ensuring the air blowing temperature to the vehicle interior and preventing the formation of frost at the cooler core.

The power of the compressor 11 consumed to ensure the air blowing temperature to the vehicle interior can be reduced, as compared to when no heat is absorbed from the vehicle-mounted device 55.

In the present embodiment, the controller 30 adjusts the flow rate of the coolant flowing through the vehicle-mounted device 55 by using the second flow adjustment valve 57 and the low-temperature side pump 25 such that the temperature of the vehicle-mounted device 55 is not below the lower limit temperature when performing the frost suppression control. Thus, the vehicle-mounted device 55 can be suppressed from being subcooled.

Specifically, the controller 30 controls the second flow adjustment valve 57 and the low-temperature side pump 25 such that the flow rate of the coolant flowing through the vehicle-mounted device 55 is reduced when the temperature of the vehicle-mounted device 55 is below its lower limit temperature during the frost suppression control, as compared to when the temperature of the vehicle-mounted device 55 exceeds the lower limit temperature. Thus, the vehicle-mounted device 55 can be suppressed from being subcooled.

Eighth Embodiment

Figure 21:
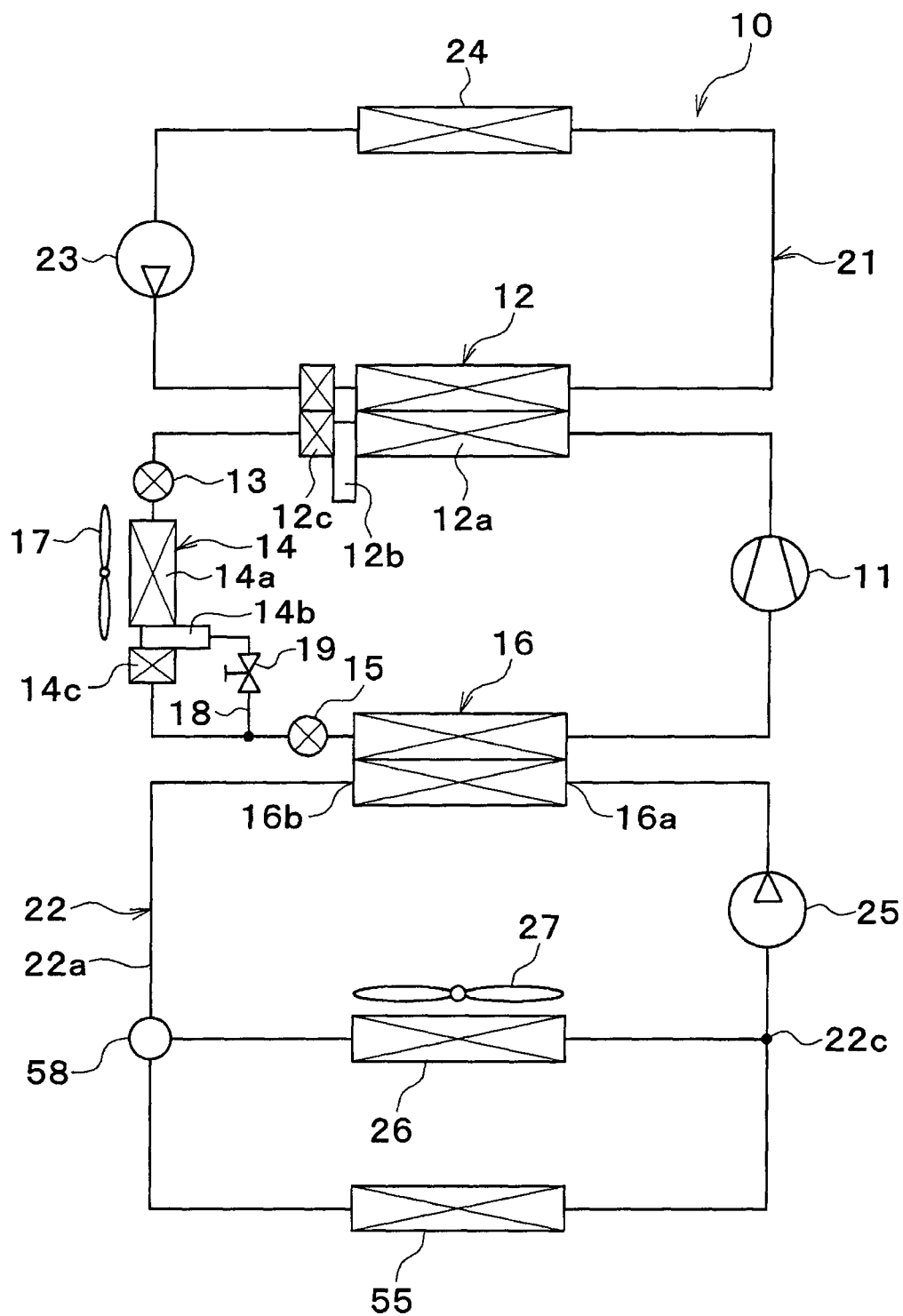
FIG. 21 is an entire configuration diagram of a refrigeration cycle device in an eighth embodiment.

In the above-mentioned seventh embodiment, the temperatures of the cooler core 26 and the vehicle-mounted device 55 are adjusted by the first flow adjustment valve 56 and the second flow adjustment valve 57. However, in the present embodiment, as shown in FIG. 21, the temperatures of the cooler core 26 and the vehicle-mounted device 55 are adjusted by a switching valve 58.

The switching valve 58 is disposed at the branch portion that branches the flow of the coolant flowing out of the low-pressure side heat exchanger 16 into the side of the cooler core 26 and the side of the vehicle-mounted device 55 in the low-temperature coolant circuit 22.

The switching valve 58 is capable of independently opening and closing the coolant flow passage on the side of the cooler core 26 and the coolant flow passage on the side of the vehicle-mounted device 55. The switching valve 58 is capable of independently adjusting the opening degree of the coolant flow passage on the side of the cooler core 26 and the opening degree of the coolant flow passage on the side of the vehicle-mounted device 55. The switching valve 58 is an electromagnetic valve controlled by the controller 30.

The switching valve 58 is a flow-rate adjustment portion that adjusts the flow rate of the coolant flowing to the cooler core 26 and the flow rate of the coolant flowing to the vehicle-mounted device 55.

In the present embodiment, the controller 30 controls the switching valve 58 such that the temperature adjustment of the cooler core 26 is prioritized over the temperature adjustment of the vehicle-mounted device 55.

Like the seventh embodiment described above, in the first dehumidification-heating mode and the second dehumidification-heating mode, the coolant cooled by the low-pressure side heat exchanger 16 flows into the cooler core 26, and the air to be blown into the vehicle interior is cooled by the cooler core 26, thereby performing dehumidification. Furthermore, the coolant heated by the high-pressure side heat exchanger 12 flows into the heater core 24, and the air cooled by the cooler core 26 is heated by the heater core 24, thereby producing the conditioned air having a target air outlet temperature.

At this time, like the seventh embodiment described above, a target air outlet temperature of the heater core 24 (i.e., a target air outlet temperature TAO) differs depending on the inside air temperature, the outside air temperature, and the like.

At a low outside air temperature (for example, 0° C. to 10° C.), by switching to the above-mentioned second dehumidification-heating mode, heat is absorbed in the exterior heat exchanger 14, the cooler core 26, and the vehicle-mounted device 55 to generate a desired heater-core air outlet temperature.

At this time, the controller 30 performs the cooler core frost prevention control (in other words, frost suppression control). Specifically, the controller 30 decreases or completely closes the opening degree of the coolant flow passage on the side of the cooler core 26 by using the switching valve 58 to thereby reduce or set the flow rate of the coolant flowing through the cooler core 26 to zero (0), when the surface temperature of the cooler core 26 or the temperature of the coolant flowing into the cooler core 26 is determined to be equal to or lower than the frost limit temperature (for example, 0° C.), or when the surface temperature of the cooler core 26 or the temperature of the coolant flowing into the cooler core 26 is anticipated to be equal to or lower than the frost limit temperature (for example, 0° C.). In this way, the surface temperature of the cooler core 26 is raised, thereby making it possible to suppress the formation of frost at the cooler core 26.

Figure 22:
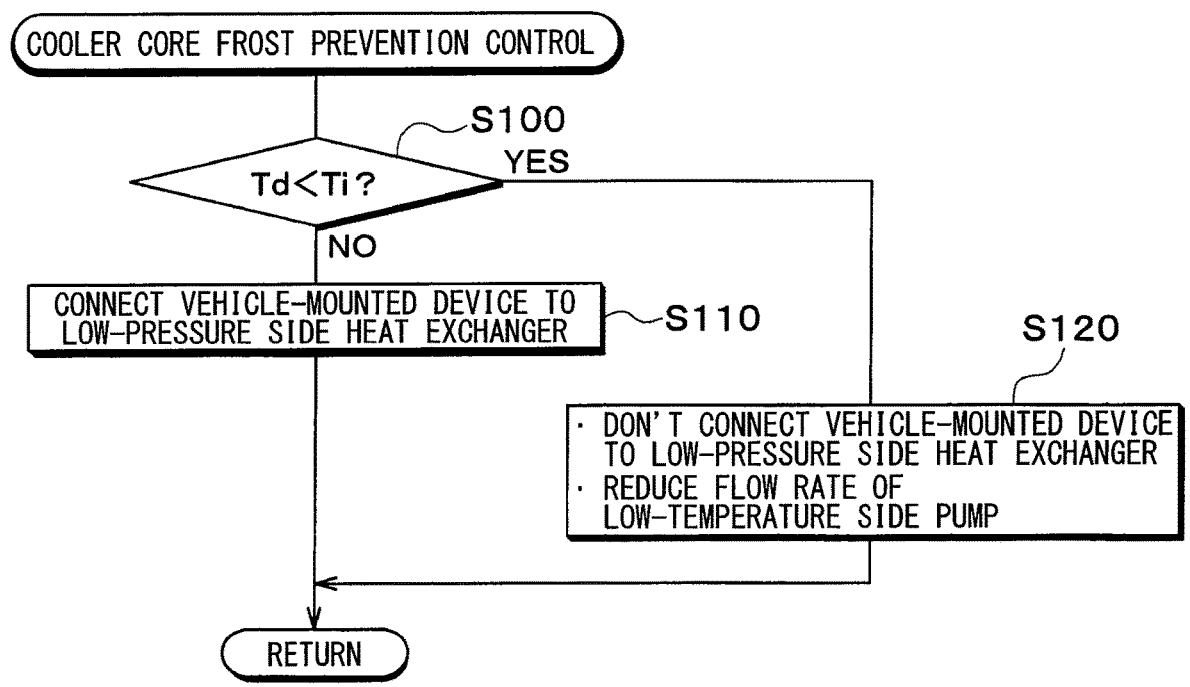
FIG. 22 is a flowchart showing control processing executed by a controller of the eighth embodiment.

The controller 30 performs the control processing shown in the flowchart of FIG. 22, during the cooler core frost prevention control.

First, in step S100, it is determined whether or not a temperature Td of the vehicle-mounted device 55 is below a lower limit temperature Ti. If the temperature Td of the vehicle-mounted device 55 is determined not to be below the lower limit temperature Ti, the processing proceeds to step S110, in which the switching valve 58 is switched to connect the vehicle-mounted device 55 to the low-pressure side heat exchanger 16. Thus, the heat absorbed from the vehicle-mounted device 55 can be used as a heat source for air-heating.

Meanwhile, if the temperature Td of the vehicle-mounted device 55 is determined to be below the lower limit temperature Ti in step S100, the processing proceeds to step S120, in which the switching valve 58 is switched not to connect the vehicle-mounted device 55 to the low-pressure side heat exchanger 16, and the flow rate of the coolant discharged from the low-temperature side pump 25 is reduced or set to zero (0).

Thus, the formation of frost at the cooler core 26 can be suppressed, and the vehicle-mounted device 55 can be suppressed from being subcooled due to the temperature Td of the vehicle-mounted device 55 that is below the lower limit temperature Ti.

The low-temperature side pump 25 is a flow-rate adjustment portion that adjusts the flow rate of the coolant flowing to the cooler core 26 and the flow rate of the coolant flowing to the vehicle-mounted device 55.

In the present embodiment, the controller 30 performs the frost suppression control on the switching valve 58 and the low-temperature side pump 25. When the frost suppression control is performed, the controller 30 controls the switching valve 58 and the low-temperature side pump 25 to cause the coolant to flow to the vehicle-mounted device 55. The frost suppression control is the control for preventing the formation of frost at the cooler core 26 by controlling the switching valve 58 and the low-temperature side pump 25 to reduce the flow rate of the coolant flowing through the cooler core 26.

Thus, like the seventh embodiment described above, the present embodiment can achieve both ensuring the air blowing temperature to the vehicle interior and preventing the formation of frost at the cooler core. The power of the compressor 11, consumed to ensure the air blowing temperature to the vehicle interior, can be reduced, as compared to when no heat is absorbed from the vehicle-mounted device 55.

In the present embodiment, the controller 30 adjusts the flow rate of the coolant flowing through the vehicle-mounted device 55 by using the switching valve 58 and the low-temperature side pump 25 such that the temperature of the vehicle-mounted device 55 is not below the lower limit temperature when performing the frost suppression control. Thus, the vehicle-mounted device 55 can be suppressed from being subcooled, like in the seventh embodiment described above.

Specifically, the controller 30 controls the switching valve 58 and the low-temperature side pump 25 such that the flow rate of the coolant flowing through the vehicle-mounted device 55 is reduced when the temperature of the vehicle-mounted device 55 is below its lower limit temperature during the frost suppression control, as compared to when the temperature of the vehicle-mounted device 55 exceeds the lower limit temperature. Thus, the vehicle-mounted device 55 can be suppressed from being subcooled, like the seventh embodiment described above.

Other Embodiments

The above-mentioned embodiments can be combined together as appropriate. For example, various modifications and changes can be made to the above-mentioned embodiments in the following way.

(1) In the above-mentioned embodiments, the modulator 12b and the subcooling portion 12c on the side of the high-pressure side heat exchanger 12 may be configured by a heat exchanging portion 12a of the high-pressure side heat exchanger 12. That is, the heat exchanging portion 12a of the high-pressure side heat exchanger 12 may store the liquid-phase refrigerant therein.

When the high-pressure side heat exchanger 12 is a refrigerant coolant heat exchanger that exchanges heat between the refrigerant and the coolant, a temperature difference between the refrigerant and the coolant becomes very small in the high-pressure side heat exchanger 12. Thus, an increase amount of a liquid refrigerant volume proportion of the high-pressure side heat exchanger 12 to an obtained subcooling degree becomes very large, as compared to when the high-pressure side heat exchanger 12 is a refrigerant air heat exchanger that exchanges heat between the refrigerant and air. Consequently, the liquid refrigerant storage amount can become large.

That is, suppose that the liquid refrigerant amount in the high-pressure side heat exchanger 12 is increased, a refrigerant condensation region is reduced, a high pressure of the refrigeration cycle is increased, and a subcooling degree is slightly increased. In such a case, the liquid refrigerant storage amount in the high-pressure side heat exchanger 12 becomes large, thus making it possible to keep the liquid refrigerant storage amount and the high pressure of the refrigeration cycle in good condition.

In the present embodiment, the modulator 12b on the side of the high-pressure side heat exchanger 12 can be integrated with the high-pressure side heat exchanger 12, thus simplifying the configuration of the refrigeration cycle.

In the present embodiment, the modulator 12b and the subcooling portion 12c on the side of the high-pressure side heat exchanger 12 exchange heat between the refrigerant and the high-temperature side coolant during the heat absorption mode, so that the liquid-phase refrigerant can be surely subcooled.

(2) Although in the above-mentioned embodiment, the refrigerant flowing out of the heat exchanging portion 12a of the high-pressure side heat exchanger 12 is stored in the modulator 12b of the high-pressure side heat exchanger 12 during the air-heating mode, the refrigerant may be stored inside the refrigerant pipe disposed between the high-pressure side heat exchanger 12 and the first expansion valve 13.

In other words, in the air-heating mode, the large volume of a refrigerant pipe located on the refrigerant outlet side of the high-pressure side heat exchanger 12 and on the refrigerant inlet side of the first expansion valve 13 may be ensured in order to enable the storage of the refrigerant flowing out of the heat exchanging portion 12a of the high-pressure side heat exchanger 12.

That is, in the above-mentioned embodiment, the first refrigerant reservoir that stores therein the refrigerant flowing out of the heat exchanging portion 12a of the high-pressure side heat exchanger 12 is the modulator 12b of the high-pressure side heat exchanger 12. Alternatively, the first refrigerant reservoir may be a refrigerant pipe on the refrigerant outlet side of the high-pressure side heat exchanger 12 and on the refrigerant inlet side of the first expansion valve 13.

Thus, since the modulator 12*b* and the subcooling portion 12*c* of the high-pressure side heat exchanger 12 are unnecessary, the total configuration can be simplified.

(3) Although in each of the above-mentioned embodiments, the coolant is used as the heat medium for adjusting the temperature of a temperature-adjustment target device, various kinds of media, such as oil, may be used as the heat medium.

Alternatively, a nanofluid may be used as the heat medium. The nanofluid is a fluid in which nanoparticles with a diameter of the order of nanometer are blended. By blending the nanoparticles into the heat medium, the following functions and effects can be obtained, in addition to the function and effect of making an antifreezing fluid by decreasing a freezing point, like a coolant using ethylene glycol.

That is, the mixture of the nanoparticles in the heat medium exhibits the functions and effects of improving the thermal conductivity in a specific temperature range, increasing the thermal capacity of the heat medium, preventing the corrosion of metal pipes and the degradation of rubber pipes, and enhancing the fluidity of the heat medium at an ultralow temperature.

These functions and effects are varied depending on the configuration, shape, and blending ratio of the nanoparticles, and additive material thereto.

Because of this, the mixture of the nanoparticles in the heat medium can improve its thermal conductivity, so that the equivalent cooling efficiency can be obtained even when using a small amount of the heat medium, as compared to the coolant using ethylene glycol.

Further, such a heat medium can also improve its thermal capacity and thereby can increase a cold storage amount due to sensible heat of the heat medium itself.

By increasing the cold storage amount, the temperature adjustment through cooling and heating of the device can be performed using the cold storage heat for some periods of time, even though the compressor 11 is not operated. Thus, the power of the vehicle thermal management system can be saved.

An aspect ratio of the nanoparticle is preferably 50 or more. This is because such an aspect ratio can obtain the adequate thermal conductivity. Here, the aspect ratio of the nanoparticle is a shape index that indicates the ratio of the width to the height of the nanoparticle.

Nanoparticles suitable for use include any one of Au, Ag, Cu, and C. Specifically, examples of usable constituent atoms of the nanoparticles include Au nanoparticles, a Ag nanowire, a carbon nanotube (CNT), a graphene, graphite core-shell nanoparticles, a Au nanoparticle-containing CNT, and the like.

CNT refers to a carbon nanotube. The graphite core-shell nanoparticle is a particle body having a structure, such as a carbon nanotube, enclosing the above-mentioned atom.

(4) In the refrigeration cycle 10 of each of the above-mentioned embodiments, a fluorocarbon refrigerant is used as the refrigerant. However, the kind of refrigerant is not limited thereto, and may be natural refrigerant, such as carbon dioxide, a hydrocarbon-based refrigerant, and the like.

The refrigeration cycle 10 in each of the above-mentioned embodiments configures a subcritical refrigeration cycle in which a high-pressure side refrigerant pressure does not exceed the critical pressure of the refrigerant, but may configure a super-critical refrigeration cycle in which a high-pressure side refrigerant pressure exceeds the critical pressure of the refrigerant.

What is claimed is:

1. A refrigeration cycle device comprising:
    a compressor that draws and discharges a refrigerant;
    a high-pressure side heat exchanger that dissipates heat from the high-pressure refrigerant discharged from the compressor;
    a first decompression portion that decompresses the refrigerant flowing out of the high-pressure side heat exchanger;
    a refrigerant outside-air heat exchanger that exchanges heat between the refrigerant flowing out of the first decompression portion and outside air;
    a second decompression portion that decompresses the refrigerant flowing out of the refrigerant outside-air heat exchanger;
    a low-pressure side heat exchanger arranged in series with the refrigerant outside-air heat exchanger in a flow of the refrigerant, the low-pressure side heat exchanger being configured to exchange heat between the low-pressure refrigerant decompressed by at least one of the first decompression portion and the second decompression portion, and a heat medium to cool the heat medium;
    a cooler core that exchanges heat between the heat medium cooled by the low-pressure side heat exchanger and air to be blown into a vehicle interior to cool the air;
    a controller configured to switch between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion; and
    a flow-rate adjustment portion that adjusts a flow rate of the heat medium in at least one of the low-pressure side heat exchanger and the cooler core, wherein
    the controller controls an operation of the flow-rate adjustment portion when a temperature of the heat medium flowing out of the low-pressure side heat exchanger is equal to or lower than 0° C. in the heat absorption mode.

2. The refrigeration cycle device according to claim 1, further comprising:
    a refrigerant reservoir that stores the refrigerant heat-exchanged in the high-pressure side heat exchanger during the heat absorption mode and stores the refrigerant heat-exchanged in the refrigerant outside-air heat exchanger during the heat dissipation mode.

3. The refrigeration cycle device according to claim 2, wherein
    in the heat absorption mode, the high-pressure side heat exchanger and the refrigerant outside-air heat exchanger are arranged in series with each other in the flow of the refrigerant,
    in the heat dissipation mode, the refrigerant outside-air heat exchanger and the low-pressure side heat exchanger are arranged in series with each other in the flow of the refrigerant, and
    the refrigerant reservoir includes: a first refrigerant reservoir disposed on a refrigerant-flow downstream side of the high-pressure side heat exchanger and on a refrigerant-flow upstream side of the first decompression portion, the first refrigerant reservoir being configured to store the refrigerant that is heat-exchanged in the high-pressure side heat exchanger; and a second refrigerant reservoir disposed on a refrigerant-flow downstream side of the refrigerant outside-air heat exchanger and on a refrigerant-flow upstream side of the second decompression portion, the second refrigerant reservoir being configured to store the refrigerant that is heat-exchanged in the refrigerant outside-air heat exchanger.

4. The refrigeration cycle device according to claim 3, wherein
the first refrigerant reservoir is integrated with the high-pressure side heat exchanger, and
the high-pressure side heat exchanger exchanges heat between the refrigerant and a high-temperature side heat medium to heat the high-temperature side heat medium,
the refrigeration cycle device further comprising a heater core that exchanges heat between the high-temperature side heat medium heated by the high-pressure side heat exchanger and the air.

5. The refrigeration cycle device according to claim 3, further comprising:
a heat-absorption mode subcooling portion that subcools the refrigerant flowing out of the first refrigerant reservoir in the heat absorption mode, wherein
the first refrigerant reservoir and the heat-absorption mode subcooling portion exchange heat between the refrigerant and the high-temperature heat medium in the heat absorption mode.

6. The refrigeration cycle device according to claim 3, further comprising:
a heat-dissipation mode subcooling portion that subcools the refrigerant flowing out of the second refrigerant reservoir in the heat dissipation mode;
a bypass portion through which the refrigerant flowing out of the refrigerant outside-air heat exchanger flows while bypassing the heat-dissipation mode subcooling portion; and
a bypass opening-degree adjustment portion that decreases an opening degree of a flow passage of the bypass portion in the heat dissipation mode, as compared to in the heat absorption mode.

7. The refrigeration cycle device according to claim 6, wherein
the heat-dissipation mode subcooling portion has a plurality of refrigerant tubes through which the refrigerant flows, the refrigeration cycle device further comprising:
a distribution tank portion that distributes the refrigerant flowing out of the second refrigerant reservoir to the plurality of refrigerant tubes, wherein
the bypass portion extends from the distribution tank portion to a refrigerant-flow downstream side of the heat-dissipation mode subcooling portion.

8. The refrigeration cycle device according to claim 1, wherein
the controller controls the operation of the flow-rate adjustment portion such that the flow rate of the heat medium in at least one of the low-pressure side heat exchanger and the cooler core is decreased as a pressure of the refrigerant in the refrigerant outside-air heat exchanger becomes lower.

9. The refrigeration cycle device according to claim 8, wherein
the flow-rate adjustment portion adjusts the flow rate of the heat medium in both the low-pressure side heat exchanger and the cooler core.

10. The refrigeration cycle device according to claim 1, further comprising:
a flow-rate adjustment portion that adjusts a flow rate of the heat medium in the low-pressure side heat exchanger, wherein
the controller controls an operation of the flow-rate adjustment portion so as to control a superheat degree of the refrigerant that is heat-exchanged in the low-pressure side heat exchanger.

11. The refrigeration cycle device according to claim 1, further comprising:
a blower that blows the air to the cooler core, wherein
the low-pressure side heat exchanger has an inlet and an outlet for the heat medium,
the cooler core includes a heat exchanging portion that exchanges heat between air and the heat medium cooled by the low-pressure side heat exchanger to cool the air, and
the heat exchanging portion is disposed at a higher position in a gravity direction than each of the inlet and the outlet.

12. The refrigeration cycle device according to claim 1, further comprising:
a blower that blows the air to the cooler core; and
a heat-medium flow passage portion through which the heat medium flows between the low-pressure side heat exchanger and the cooler core, wherein
the low-pressure side heat exchanger has an inlet and an outlet for the heat medium, and
at least a part of the heat-medium flow passage portion is disposed at a lower position in the gravity direction than the heat exchanging portion.

13. A refrigeration cycle device comprising:
a compressor that draws and discharges a refrigerant;
a high-pressure side heat exchanger that dissipates heat from the high-pressure refrigerant discharged from the compressor;
a first decompression portion that decompresses the refrigerant flowing out of the high-pressure side heat exchanger;
a refrigerant outside-air heat exchanger that exchanges heat between the refrigerant flowing out of the first decompression portion and outside air;
a second decompression portion that decompresses the refrigerant flowing out of the refrigerant outside-air heat exchanger;
a low-pressure side heat exchanger that absorbs heat into the low-pressure refrigerant decompressed by at least one of the first decompression portion and the second decompression portion;
a controller that switches between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion;
a refrigerant reservoir that stores the refrigerant heat-exchanged in the high-pressure side heat exchanger during the heat absorption mode and stores the refrigerant heat-exchanged in the refrigerant outside-air heat exchanger during the heat dissipation mode;
the refrigerant reservoir includes: a first refrigerant reservoir disposed on a refrigerant-flow downstream side of the high-pressure side heat exchanger and on a refrigerant-flow upstream side of the first decompression portion, the first refrigerant reservoir being configured to store the refrigerant that is heat-exchanged in the high-pressure side heat exchanger; and a second refrigerant reservoir disposed on a refrigerant-flow downstream side of the refrigerant outside-air heat exchanger and on a refrigerant-flow upstream side of the second decompression portion, the second refrigerant reservoir being configured to store the refrigerant that is heat-exchanged in the refrigerant outside-air heat exchanger;
a heat-dissipation mode subcooling portion that subcools the refrigerant flowing out of the second refrigerant reservoir in the heat dissipation mode;
a bypass portion through which the refrigerant flowing out of the refrigerant outside-air heat exchanger flows while bypassing the heat-dissipation mode subcooling portion; and
a bypass opening-degree adjustment portion that decreases an opening degree of a flow passage of the bypass portion in the heat dissipation mode, as compared to in the heat absorption mode, wherein
in the heat absorption mode, the high-pressure side heat exchanger and the refrigerant outside-air heat exchanger are arranged in series with each other in the flow of the refrigerant, and
in the heat dissipation mode, the refrigerant outside-air heat exchanger and the low-pressure side heat exchanger are arranged in series with each other in the flow of the refrigerant.

14. A refrigeration cycle device comprising:
a compressor that draws and discharges a refrigerant;
a high-pressure side heat exchanger that dissipates heat from the high-pressure refrigerant discharged from the compressor;
a first decompression portion that decompresses the refrigerant flowing out of the high-pressure side heat exchanger;
a refrigerant outside-air heat exchanger that exchanges heat between the refrigerant flowing out of the first decompression portion and outside air;
a second decompression portion that decompresses the refrigerant flowing out of the refrigerant outside-air heat exchanger;
a low-pressure side heat exchanger arranged in series with the refrigerant outside-air heat exchanger in a flow of the refrigerant, the low-pressure side heat exchanger being configured to exchange heat between the low-pressure refrigerant decompressed by at least one of the first decompression portion and the second decompression portion, and a heat medium to cool the heat medium;
a cooler core that exchanges heat between the heat medium cooled by the low-pressure side heat exchanger and air to be blown into a vehicle interior to cool the air; and
a controller configured to switch between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion, wherein
the high-pressure side heat exchanger exchanges heat between the refrigerant and a high-temperature side heat medium to heat the high-temperature side heat medium, the refrigeration cycle device further comprising:
a high-temperature side heat-medium heat exchanger that exchanges heat with the high-temperature side heat medium heated by the high-pressure side heat exchanger; and
a high-temperature side flow-rate adjustment portion that adjusts a flow rate of the high-temperature side heat medium flowing through the high-pressure side heat exchanger, wherein
the controller stops the high-temperature side flow rate adjustment portion in the heat dissipation mode, and controls an operation of the high-temperature side flow rate adjustment portion to increase the flow rate of the high-temperature side heat medium flowing through the high-pressure side heat exchanger when a temperature of the high-temperature side heat medium in the high-pressure side heat exchanger becomes equal to or higher than a predetermined temperature in the heat dissipation mode.

15. A refrigeration cycle device comprising:
a compressor that draws and discharges a refrigerant;
a high-pressure side heat exchanger that dissipates heat from the high-pressure refrigerant discharged from the compressor;
a first decompression portion that decompresses the refrigerant flowing out of the high-pressure side heat exchanger;
a refrigerant outside-air heat exchanger that exchanges heat between the refrigerant flowing out of the first decompression portion and outside air;
a second decompression portion that decompresses the refrigerant flowing out of the refrigerant outside-air heat exchanger;
a low-pressure side heat exchanger arranged in series with the refrigerant outside-air heat exchanger in a flow of the refrigerant, the low-pressure side heat exchanger being configured to exchange heat between the low-pressure refrigerant decompressed by at least one of the first decompression portion and the second decompression portion, and a heat medium to cool the heat medium;
a cooler core that exchanges heat between the heat medium cooled by the low-pressure side heat exchanger and air to be blown into a vehicle interior to cool the air;
a controller configured to switch between a heat absorption mode in which the refrigerant outside-air heat exchanger absorbs heat into the refrigerant and a heat dissipation mode in which the refrigerant outside-air heat exchanger dissipates heat from the refrigerant, by adjusting an amount of decompression in each of the first decompression portion and the second decompression portion;
a heat supply device through which the heat medium circulates and which supplies heat to the heat medium; and
a heat-exchanger flow-rate adjustment portion that adjusts a flow rate of at least one of the outside air and the refrigerant, flowing into the refrigerant outside-air heat exchanger, wherein
the controller controls an operation of the heat-exchanger flow-rate adjustment portion such that a flow rate of at least one of the outside air and the refrigerant, flowing into the refrigerant outside-air heat exchanger, is decreased when a temperature difference between the refrigerant and the outside air, flowing into the refrigerant outside-air heat exchanger, is equal to or less than a predetermined value.

16. The refrigeration cycle device according to claim 15, wherein
the heat-exchanger flow-rate adjustment portion is an outside-air blower that blows the outside air to the refrigerant outside-air heat exchanger, and
the controller controls an operation of the outside-air blower to invert a blowing direction of the outside air toward the refrigerant outside-air heat exchanger when a temperature difference between the refrigerant and the outside air, flowing into the refrigerant outside-air heat exchanger, is equal to or less than a predetermined value.

17. The refrigeration cycle device according to claim 15, wherein
the heat-exchanger flow-rate adjustment portion is a shutter that adjusts an opening degree of a passage for the outside air flowing through the refrigerant outside-air heat exchanger, and
the controller controls an operation of the shutter to decrease the opening degree when a temperature difference between the refrigerant and the outside air, flowing into the refrigerant outside-air heat exchanger, is equal to or less than a predetermined value.

\* \* \* \* \*